United States Patent
Hong

(10) Patent No.: US 12,349,228 B2
(45) Date of Patent: Jul. 1, 2025

(54) METHOD FOR CONTROLLING SIDELINK COMMUNICATION, AND APPARATUS THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 414 days.

(21) Appl. No.: 17/769,878

(22) PCT Filed: Oct. 15, 2020

(86) PCT No.: PCT/KR2020/014061
§ 371 (c)(1),
(2) Date: Apr. 18, 2022

(87) PCT Pub. No.: WO2021/080240
PCT Pub. Date: Apr. 29, 2021

(65) Prior Publication Data
US 2022/0394810 A1    Dec. 8, 2022

(30) Foreign Application Priority Data

Oct. 24, 2019 (KR) .................. 10-2019-0133035
Oct. 5, 2020 (KR) .................. 10-2020-0127914

(51) Int. Cl.
*H04W 76/28* (2018.01)
*H04L 1/1812* (2023.01)
*H04W 24/08* (2009.01)
*H04W 72/23* (2023.01)
*H04W 92/18* (2009.01)

(52) U.S. Cl.
CPC .......... *H04W 76/28* (2018.02); *H04L 1/1812* (2013.01); *H04W 24/08* (2013.01); *H04W 72/23* (2023.01); *H04W 92/18* (2013.01)

(58) Field of Classification Search
None
See application file for complete search history.

(56) References Cited

U.S. PATENT DOCUMENTS

2016/0219620 A1    7/2016   Lee et al.
2019/0052413 A1    2/2019   Babaei et al.
(Continued)

FOREIGN PATENT DOCUMENTS

EP      4183221 A2        5/2023
KR      10-2017-0108987 A 9/2017

OTHER PUBLICATIONS

NTT Docomo, Inc et al., "Clarification on PDCCH monitoring during DRX mode", R2-1803682, 3GPP TSG-RAN2 Meeting #101, Athens, Greece, Feb. 26-Mar. 2, 2018.
(Continued)

*Primary Examiner* — Benjamin Lamont
(74) *Attorney, Agent, or Firm* — IP Legal Services, LLC

(57) ABSTRACT

Provided are a method and apparatus for controlling sidelink communication. The method for performing, by a terminal, sidelink communication, may include the steps of: for a sidelink HARQ operation, receiving, from a base station, sidelink discontinuous HARQ configuration information used for monitoring a physical downlink control channel (PDCCH); transmitting sidelink data; and monitoring, in a PDCCH discontinuous monitoring section, the PDCCH configured on the basis of discontinuous reception (DRX) parameters included in the sidelink discontinuous HARQ configuration information.

15 Claims, 21 Drawing Sheets

(56) References Cited

U.S. PATENT DOCUMENTS

| | | | |
|---|---|---|---|
| 2019/0174534 A1 | 6/2019 | Lee et al. | |
| 2019/0208538 A1 | 7/2019 | Lee et al. | |
| 2020/0128580 A1 | 4/2020 | Lee et al. | |
| 2020/0137786 A1 | 4/2020 | Lee et al. | |
| 2020/0275474 A1* | 8/2020 | Chen | H04L 1/1848 |
| 2021/0051588 A1* | 2/2021 | Wu | H04W 52/0235 |
| 2022/0140950 A1 | 5/2022 | Babaei et al. | |
| 2022/0312241 A1* | 9/2022 | Xu | H04W 24/08 |
| 2023/0199909 A1 | 6/2023 | Mohammad et al. | |
| 2023/0246746 A1 | 8/2023 | Babaei et al. | |

OTHER PUBLICATIONS

Catt, "Leftover Issues on DRX", R2-1800166, 3GPP TSG-RAN WG2 #Adhoc, Vancouver, Canada, Jan. 22-26, 2018, pp. 1-7.

Xiaomi, "Avoid ping pong state transition for sidelink UE", R2-1912911, 3GPP TSG-RAN WG2 Meeting #107b, Chongqing, China, Oct. 14-18, 2019, pp. 1-4.

Samsung, "Remaining issues on DRX", R2-1809499, 3GPP TSG-RAN WG2 NR AH 1807, Montreal, QC, Canada, Jul. 2-6, 2018.

LG Electronics Inc., "Remaining V2X MAC Issues", R2-2003524, 3GPP TSG-RAN WG2 #109-e, Online, Apr. 20-30, 2020.

Huawei et al., "Discussion on remaining MAC open issues for 5G V2X with NR SL", R2-2003555, 3GPP TSG-RAN WG2 Meeting #109-bis electronic, Apr. 20-30, 2020.

Huawei et al., "Draft CR on TS 38.321 on the remaining MAC Open issues for 5G V2X with NR SL", R2-2003556, 3GPP TSG-RAN WG2 Meeting #109-bis electronic, Apr. 20-30, 2020.

3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.7.0 (Sep. 2019).

European Patent Office, Extended European Search Report of corresponding EP Patent Application No. 20879753.0, Sep. 29, 2023.

* cited by examiner

FIG.8
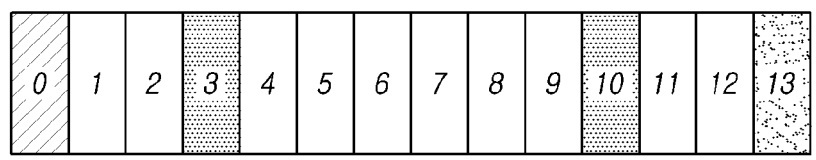
DMRS location for Rel. 12/13 PSBCH PSCCH/PSSCH
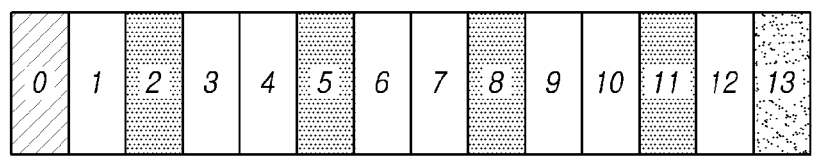
DMRS location for V2V PSBCH/PSSCH

D2D signal transmission from a UE allocated with unit #0

*FIG.19*

*DRX information element*

```
DRX-Config ::=              SEQUENCE {
......
    drx-HARQ-RTT-TimerDL        INTEGER (0..56),
    drx-HARQ-RTT-TimerUL        INTEGER (0..56),
    drx-RetransmissionTimerDL   ENUMERATED {
                                sl0, sl1, sl2, sl4, sl6, sl8, sl16, sl24, sl33, sl40, sl64, sl80,
                                sl96, sl112, sl128, sl160, sl320, spare15, spare14, spare13,
                                spare12, spare11, spare10, spare9, spare8, spare7, spare6,
                                spare5, spare4, spare3, spare2, spare1 },
    drx-RetransmissionTimerUL   ENUMERATED {
                                sl0, sl1, sl2, sl4, sl6, sl8, sl16, sl24, sl33, sl40, sl64, sl80,
                                sl96, sl112, sl128, sl160, sl320, spare15, spare14, spare13,
                                spare12, spare11, spare10, spare9, spare8, spare7, spare6, spare5,
                                spare4, spare3, spare2, spare1 },
......
```

METHOD FOR CONTROLLING SIDELINK COMMUNICATION, AND APPARATUS THEREFOR

CROSS REFERENCE TO RELATED APPLICATIONS

This application is a National Stage Patent Application of PCT International Patent Application No. PCT/KR2020/014061 (filed on Oct. 15, 2020) under 35 U.S.C. § 371, which claims priority to Korean Patent Application Nos. 10-2019-0133035 (filed on Oct. 24, 2019) and 10-2020-0127914 (filed on Oct. 5, 2020), the teachings of which are incorporated herein in their entireties by reference.

TECHNICAL FIELD

The disclosure relates to method and apparatus for controlling sidelink communication.

BACKGROUND ART

There is demand for large-capacity data processing, high-rate data processing, and various services using wireless terminals in vehicles and industrial sites. To satisfy such demand, it is required to develop a communication system capable of processing large volume of data at a high-rate to provide a video service, a wireless data service, and a machine-type communication service, as well as a simple voice service.

To this end, the International Telecommunication Union Radio communication sector (ITU-R) discloses the requirements for adopting the International Mobile Telecommunication 2000 (IMT-2020) international standard, and many studies have been conducted on next-generation wireless communication technology to meet the requirements of IMT-2020.

In particular, the $3^{rd}$ generation partnership project (3GPP) has been conducting research on the Long Term Evolution (LTE)-advanced Pro Rel-15/16 standards and the new radio access technology (NR) standard in parallel to meet the requirements for IMT-2020, called 5G technology. 3GPP has a plan to approve the two standards as next-generation wireless communication technology.

5G technology may be applied and utilized in autonomous vehicles. For this, it is necessary to apply 5G technology to sidelink communication (e.g., vehicle communication (V2X)), and autonomous driving requires high-rate transmission and reception while guaranteeing high reliability for increasing data.

Further, to meet driving scenarios of various autonomous vehicles, such as platooning, it is required to ensure various types of data communication, such as multicast data transmission/reception as well as multiple unicast data transmissions/receptions using sidelink communication.

However, for this purpose, the UE performing sidelink communication should continuously monitor control data or user data in the sidelink radio resource or base station radio resource according to whether sidelink communication data is received. This may cause drastic increase in power consumption.

DETAILED DESCRIPTION OF THE INVENTION

Technical Problem

The present disclosure introduces a method and device for preventing drastic increase in power consumption that may occur during sidelink communication.

Technical Solution

In accordance with an embodiment, a method may be provided for performing sidelink communication by a UE. The method may include receiving, from a base station, sidelink discontinuous HARQ configuration information used for physical downlink control channel (PDCCH) monitoring, for a sidelink HARQ operation, transmitting sidelink data, and monitoring a PDCCH in a PDCCH discontinuous monitoring period set based on a discontinuous reception (DRX) parameter included in the sidelink discontinuous HARQ configuration information.

In accordance with another embodiment, a method may be provided for controlling sidelink communication by a base station. The method may include transmitting, to a UE, sidelink discontinuous HARQ configuration information used for physical downlink control channel (PDCCH) monitoring, for a sidelink HARQ operation, receiving, from the UE, HARQ feedback information for sidelink data transmission, and transmitting a PDCCH including sidelink resource allocation information for HARQ retransmission of the sidelink data in a PDCCH discontinuous monitoring period of the UE, set based on a discontinuous reception (DRX) parameter included in the sidelink discontinuous HARQ configuration information.

In accordance with still another embodiment, a UE may be provided for performing sidelink communication. The UE may include a receiver receiving, from a base station, sidelink discontinuous HARQ configuration information used for physical downlink control channel (PDCCH) monitoring, for a sidelink HARQ operation, a transmitter transmitting sidelink data, and a controller monitoring a PDCCH in a PDCCH discontinuous monitoring period set based on a discontinuous reception (DRX) parameter included in the sidelink discontinuous HARQ configuration information.

In accordance with yet still another embodiment, a base station may be provided for controlling sidelink communication. The base station may include a transmitter transmitting, to a UE, sidelink discontinuous HARQ configuration information used for physical downlink control channel (PDCCH) monitoring, for a sidelink HARQ operation, and a receiver receiving, from the UE, HARQ feedback information for sidelink data transmission, wherein the transmitter transmits a PDCCH including sidelink resource allocation information for HARQ retransmission of the sidelink data in a PDCCH discontinuous monitoring period of the UE, set based on a discontinuous reception (DRX) parameter included in the sidelink discontinuous HARQ configuration information.

Advantageous Effects

The embodiments may prevent drastic increase in power consumption that may occur during sidelink communication.

BRIEF DESCRIPTION OF DRAWINGS

FIG. 8 is a view illustrating examples of a typical DMRS structure for sidelink and a DMRS structure for sidelink according to the present embodiments;

FIG. 19 is a view illustrating a DRX configuration (DRX-Config) information element according to an embodiment;

MODE FOR CARRYING OUT THE INVENTION

Figure 1:
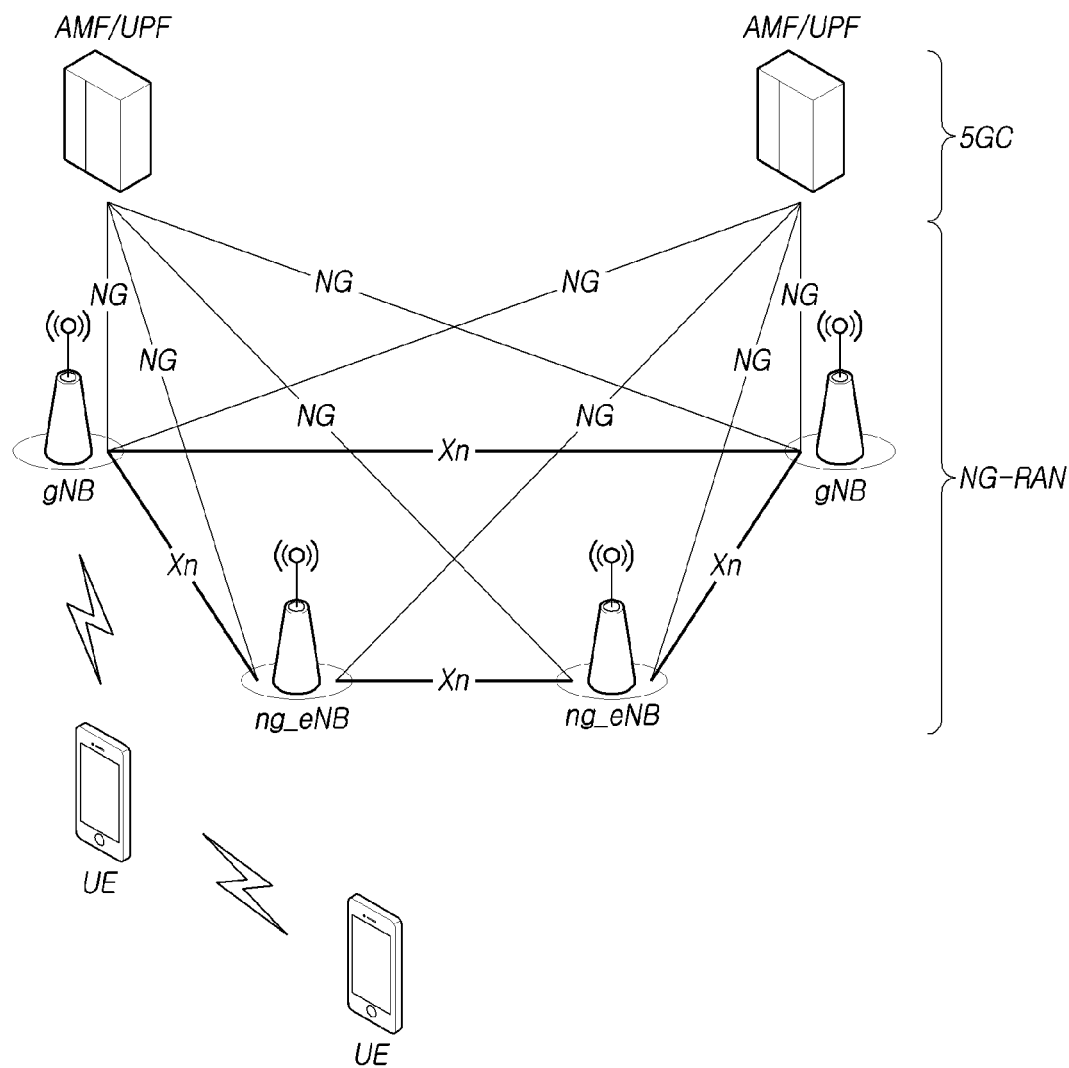
FIG. 1 is a view schematically illustrating an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, Wi-Fi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system to which the present embodiment is applicable.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "μ" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. A frame that includes 10 subframes each having the same length of 1 ms and has a length of 10 ms is defined in the frame structure in NR. One frame may be divided into half frames of 5 ms, and each half frame includes 5 subframes. In the case of a subcarrier spacing of 15 kHz, one subframe includes one slot, and each slot includes 14 OFDM symbols.

Figure 2:
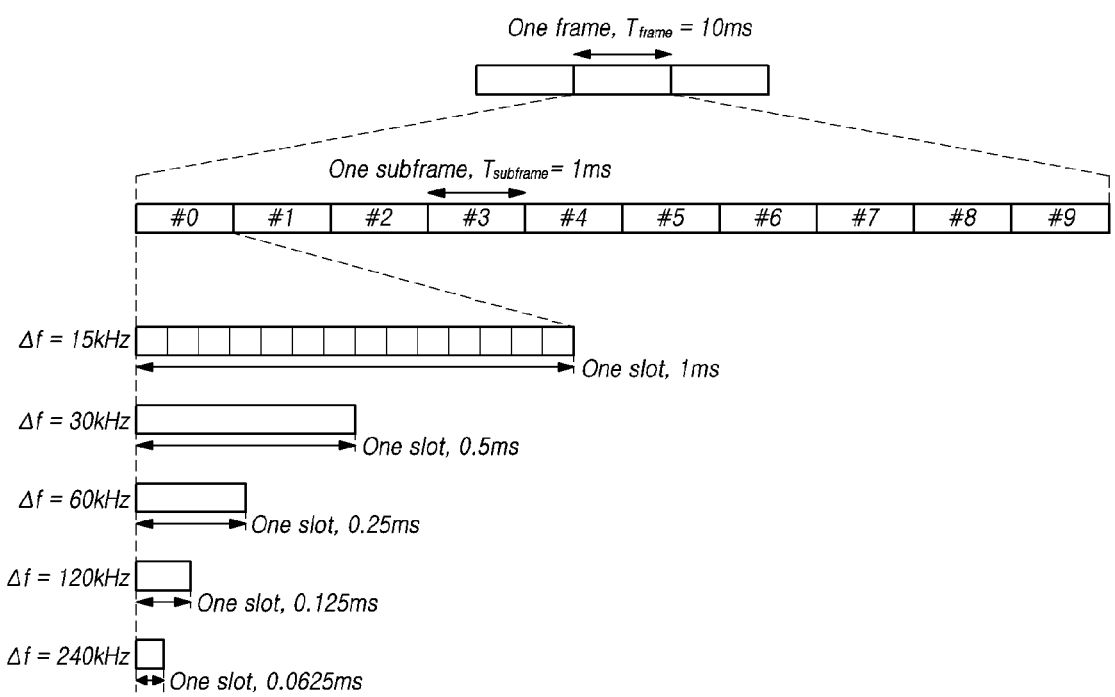
FIG. 2 is a view schematically illustrating a frame structure in an NR system in accordance with embodiments of the present disclosure.

FIG. 2 is a view for explaining a frame structure in an NR system to which the present embodiment may be applied.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically instruct the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
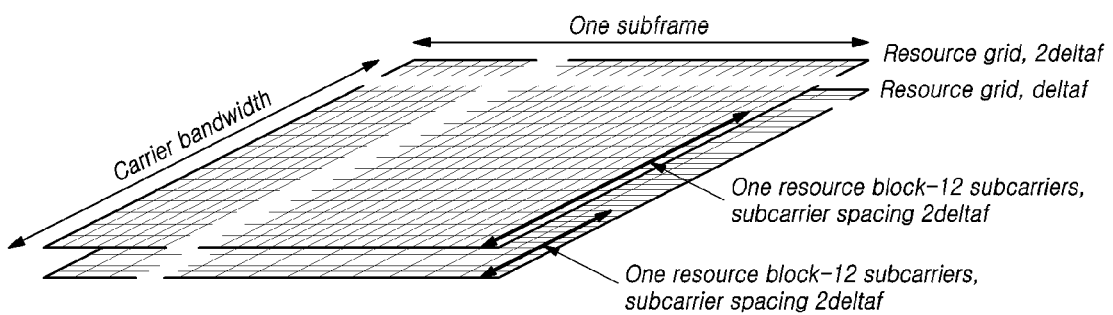
FIG. 3 is a view for explaining resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
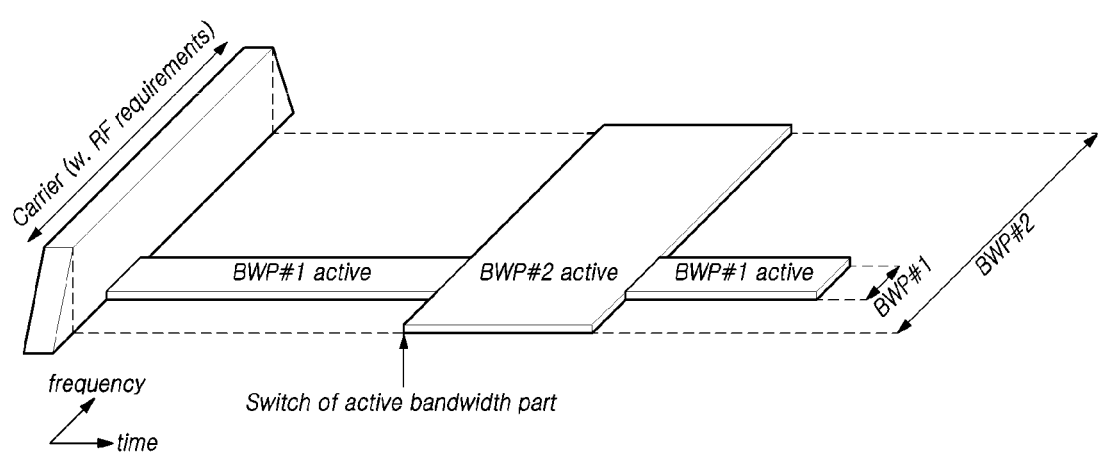
FIG. 4 is a view for explaining bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
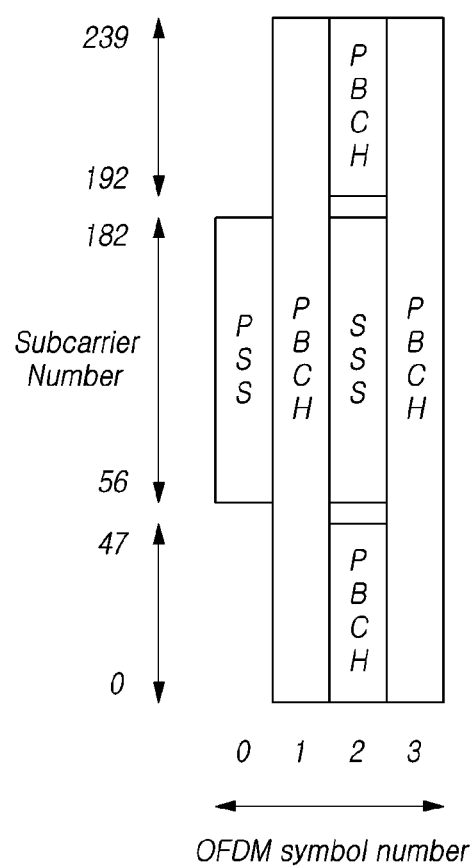
FIG. 5 is a view illustrating an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
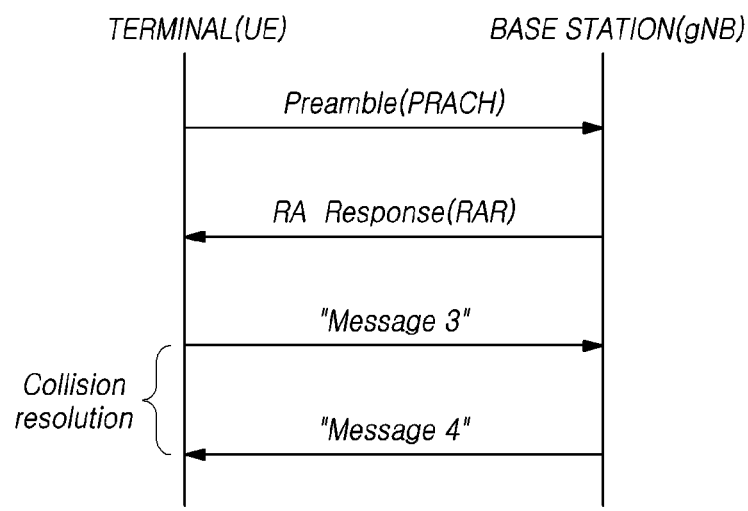
FIG. 6 is a signal diagram for explaining a random access procedure in a radio access technology in accordance with embodiments of the present disclosure.

FIG. 6 is a view for explaining a random access procedure in a radio access technology to which the present embodiment is applicable.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
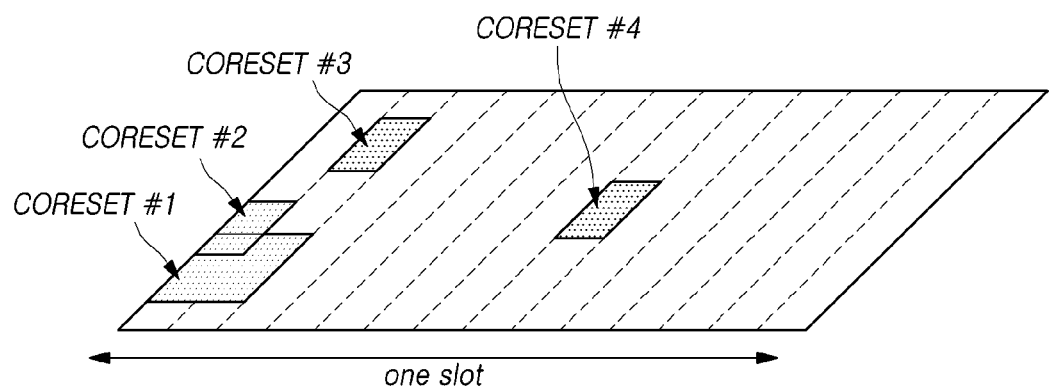
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<LTE Sidelink>

In the LTE system, for providing device-to-device communication and vehicle-to-everything (V2X) (in particular, vehicle-to-vehicle (V2V)) service, designs for a radio channel and a radio protocol for direct communication (i.e., sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to assign a radio resource for the sidelink, two modes have been developed, i.e., i) mode 1 in which a base station assigns a radio resource and ii) mode 2 in which a UE selects and assigns a radio resource from a radio resource pool. Further, in order to satisfy the V2X scenario in the LTE system, a related technology has been required to be developed additionally.

In such an environment, the 3GPP have derived 27 service scenarios related to vehicle recognition/detection in Rel-14, and determined key performance requirements according to road conditions. In addition, the 3GPP have derived 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource assignment technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Sidelink Physical Layer Design>

For V2X communication, a demodulation reference signal (DMRS) is a pilot signal and needs to be allocated more than D2D communication in order to improve channel estimation performance and frequency offset estimation performance.

FIG. 8 illustrates a DMRS structure for a typical sidelink and a DMRS structure for a sidelink.

Referring to FIG. 8, two typical (Rel-12/13) DMRSs are allocated per subframe of PSCCH, PSSCH, and PSBCH, and the interval between DMRSs is 0.5 ms. The C-V2X terminal uses the 6 GHz center frequency band defined for sidelink transmission, and the vehicle terminal moves at 280 km/h considering the relative speed. At this time, the correlation time becomes 0.277 ms, and since this value is shorter than the interval between reference signals of Rel-12/13, the channel estimation time is insufficient. To solve this problem, in the sidelink for V2X communication, the number of DMRSs per subframe was increased to 4, and the interval between reference signals was reduced to 0.214 ms, so that the physical layer design was changed to facilitate channel estimation even with rapid channel changes.

On the other hand, as an example of selecting a DMRS symbol pattern in the dedicated carrier, DMRS is allocated at $2^{nd}/5^{th}/8^{th}/11^{th}$ OFDM symbols in PSCCH/PSSCH, and DMRS is allocated at $3^{rd}/5^{th}/8^{th}/10^{th}$ OFDM symbols in PSBCH. In the 2 GHz band, the Rel-12/13 scheme having two DMRSs may be used as it is. That is, the number and pattern of DMRS transmission may be configured differently according to channels and carrier frequency bands.

In addition, since the time division multiplexing (TDM) method used in D2D is not suitable for C-V2X in which a large number of vehicles are densely connected at the same time, a frequency division multiplexing (FDM) method is used.

<Resource Assignment>

Figure 9:
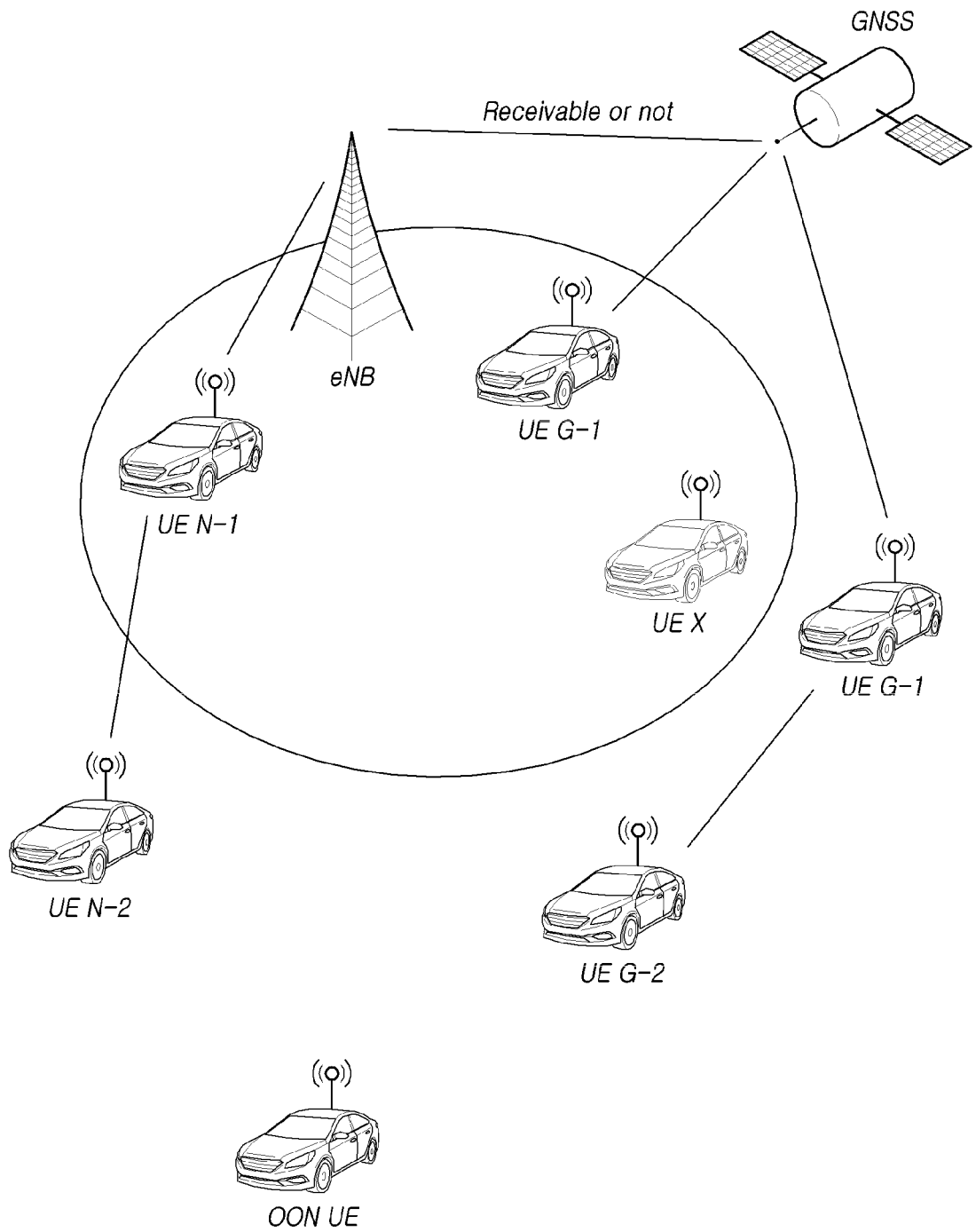
FIG. 9 is a view for explaining various scenarios for sidelink communication.

FIG. 9 illustrates various scenarios for Sidelink communication.

Referring to FIG. 9, a V2X device (represented to a vehicle; however, may be replaced with other devices, such as a user equipment (UE), etc.) may be located in coverage of a base station (an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to assign a radio resource for enabling a corresponding UE to perform communication using the sidelink. The assignment of the radio resource includes a method of a base station for handling the assignment of the radio resource and a method of a UE on its own selects and assigns the radio resource.

Specifically, in the D2D, for enabling a UE to assign a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area assigned to this to a transmitter UE.

Figure 10:
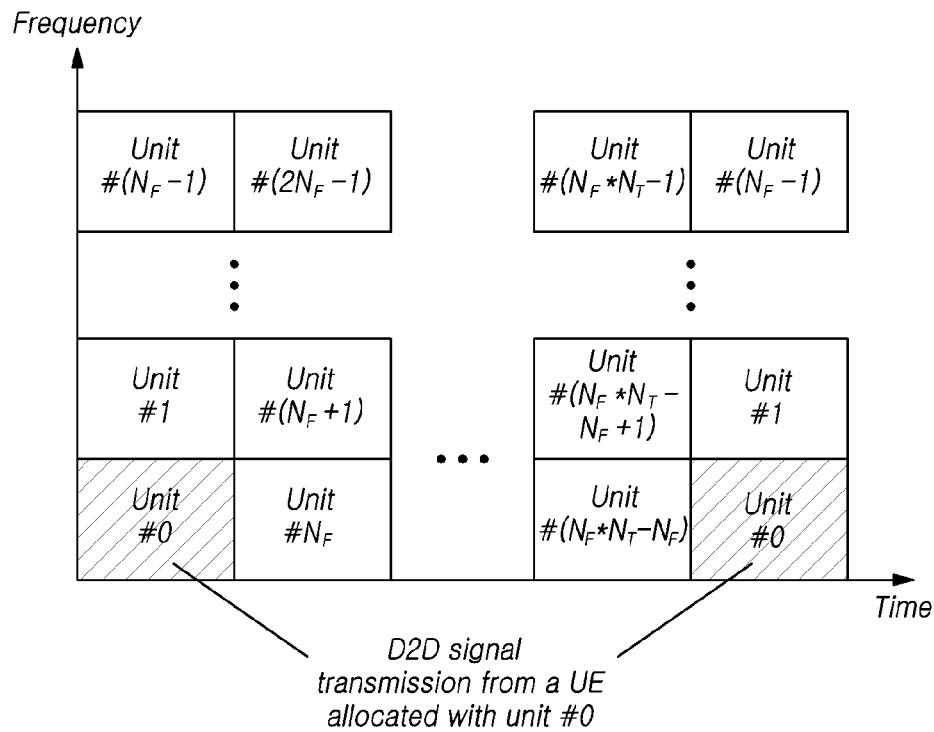
FIG. 10 is a view illustrating a first UE (UE1) and a second UE (UE2) performing sidelink communication and exemplary resource pools for UEs.

FIG. 10 illustrates a first user equipment (UE1) and a second user equipment (UE2) performing sidelink communication, and an example of resource pools used by the UEs.

Referring to FIG. 10, a base station is represented as an eNB; however, may be a gNB or an ng-eNB as described above. Further, the UEs are represented as mobile terminals; however, vehicles, infrastructures, or the like may be applied variously depending on scenarios or situations.

In FIG. 10, the transmitter UE (UE 1) may select a resource unit corresponding to a specific resource within a resource pool including a set of resources, and transmit a sidelink signal using the resource unit. The receiver UE (UE 2) may be configured with a resource pool over which the UE 1 is allowed to transmit a signal, and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 10, the entire frequency resource is divided into $N_F$ frequency resources, and the entire time resource is divided into $N_T$ time resources. Thus, a total of $N_F * N_T$ resource units can be defined. In this case, it is possible to express that a corresponding resource pool is repeated at a period of $N_T$ subframes. In particular, one resource unit may be configured to be provided periodically and repeatedly, as illustrated in FIG. 10.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitter UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may lead a time delay until a data resource is assigned after a SA resource has been assigned to be reduced. For example, it is possible to consider a non-adjacent scheme in which a control channel resource and a data channel resource are split in time domain in one subframe, an adjacent scheme in which a control channel and a data channel are consecutively assigned in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitter UE to transmit information, such as an ID of the transmitter UE, or the like, and a neighboring UE to discover the transmitter UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of assigning a resource (e.g., whether a base station dedicates a resource for transmitting a signal to a transmitter UE or whether a transmitter UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a sidelink communication UE may be located out of coverage of a base station. In even this situation, it is necessary for communication using the sidelink to be performed. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a pre-configured length, a structure similar to the PSS, a structure changed from the PSS, or a structure in which the PSS is repeated. Unlike a DL PSS, a different Zadoff-chu root index (e.g., 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS, or the PSSCH. The SLSS may be in the form of a specific sequence, and the PSSCH may be a sequence representing specific information or in the form of a codeword after pre-defined channel coding has been performed.

Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<NR Sidelink>

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X.

To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 11:
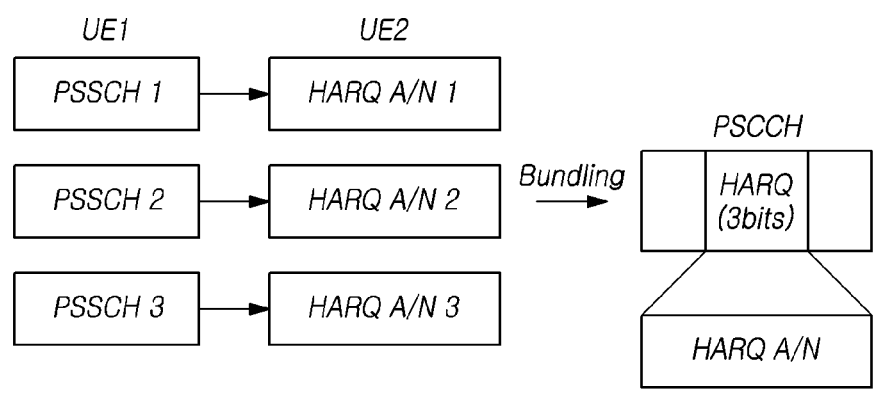
FIG. 11 is a view for explaining a method of bundling and transmitting HARQ feedback information in the sidelink.

FIG. 11 illustrates a method of bundling and transmitting HARQ feedback information in the sidelink.

Referring to FIG. 11, in the LTE V2X, separate HARQ ACK/NACK information is not transmitted in order to reduce system overhead, and data are allowed to be retransmitted once according to discretion of a transmitter UE for data transmission safety. However, in the NR V2X, in terms of data transmission stability, HARQ ACK/NACK information may be transmitted. In this case, overhead may be reduced by bundling and transmitting the corresponding information.

That is, when a transmitter UE UE1 transmits three data transmissions to a receiver UE UE2, and then the receiver UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

Figure 12:
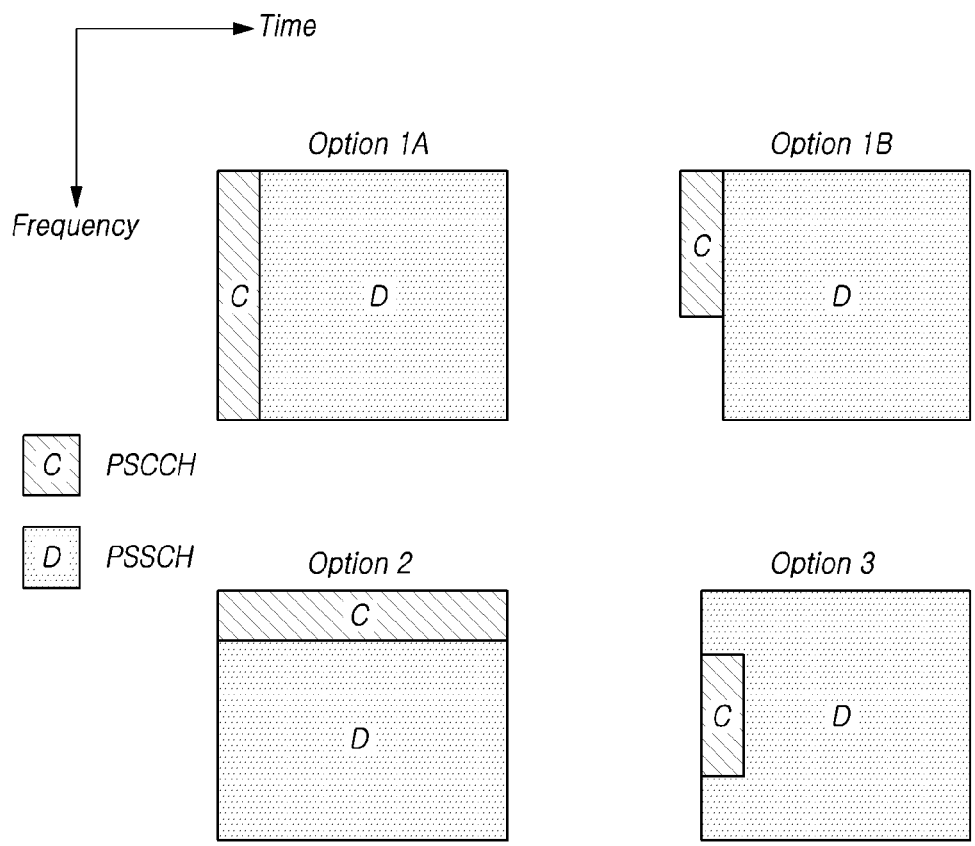
FIG. 12 is a view for explaining of multiplexing of a PSCCH associated sidelink and an associated PSSCH.

The following four options have been discussed for multiplexing of a PSCCH and an associated PSSCH, as illustrated in FIG. 12. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Assignment

At least two sidelink resource allocation modes, i.e., mode 3 and mode 4, may by defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource assignment sub-modes. That is, UE may automatically select a sidelink resource for transmission, help to select a sidelink resource for other UE(s), be configured with grant configured for sidelink transmission, or schedule the sidelink transmission of other UE(s).

NR Preemption

In the case of a UE critical to delay, such as a URLLC UE, the UE may preempt and use a data resource that has already been allocated to another eMBB UE. Further, information indicating which region of the data resource has been preempted may be indicated to the UE through group common DCI.

Uu Interface-Based Sidelink Resource Allocation/Configuration

NR Uu may allocate NR sidelink resources for a dedicated NR sidelink carrier and/or a licensed carrier shared between the Uu and the NR sidelink. In this case, resource allocation may support dynamic resource allocation and activation/deactivation-based resource allocation. Activation/deactivation-based resource allocation may reuse SPS allocation or NR grant free type-2.

As used herein, a frequency, a frame, a subframe, a resource, a resource block, a region, a band, a subband, a control channel, a data channel, a synchronization signal, various reference signals, various signals, and various messages related to new radio (NR) may be interpreted in various meanings as currently used or to be used in the future.

NR (New Radio)

3GPP recently introduced NR, and NR has been designed to meet various QoS requirements required for each of further divided and specified use scenarios as well as an enhanced data rate as compared to LTE. In particular, as representative usage scenarios of NR, enhancement mobile broadband (eMBB), massive MTC (mMTC), and ultra-reliable and low latency communications (URLLC) have been defined. As a method for meeting the requirements for each usage scenario, it is required to design a frame structure (e.g., flexible frame structure) to be flexible as compared with LTE. Each use scenario has different requirements for data rates, latency, reliability, coverage, etc. Therefore, as a method to efficiently satisfy the requirements for each usage scenario through the frequency band constituting a NR system has been designed to efficiently multiplex radio resource units which are based on different numerologies (e.g., subcarrier spacing, subframe, TTI, etc.).

For example, there has been discussions on a method for multiplexing and supporting numerology having different subcarrier spacings based on TDM, FDM, or TDM/FDM through one or more NR component carriers. Also discussions have been made for a scheme for supporting more than one time units in configuring a scheduling unit in the time domain. In this regard, NR defines a subframe as one type of time domain structure. As reference numerology for defining the subframe duration, it has been determined to define a single subframe duration composed of 14 OFDM symbols of normal CP overhead based on 15 kHz sub-carrier spacing (SCS) which is the same as that of LTE. Accordingly, in NR, the subframe is defined to have 1 ms time duration. However, unlike LTE, the subframe of NR is absolute reference time duration. As a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Therefore, a slot is constituted of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in any numerology (or SCS), a mini-slot which is constituted of a smaller number of symbols than the above-described slot is defined. For minislot-based uplink/downlink data transmission/reception, a short-length time-domain scheduling interval may be set, or a long-length time-domain scheduling interval for uplink/downlink data transmission/reception may be configured via slot aggregation. In particular, in the case where latency-sensitive data, such as URLLC, is transmitted or received, if scheduling is performed in slot units which are based on 1 ms (14 symbols) as defined in the numerology-based frame structure which has a small SCS value, e.g., 15 kHz, it is difficult to satisfy the latency requirements. Thus, a mini-slot constituted of a smaller number of OFDM symbols than the slot constituted of 14 symbols may be defined. Based thereupon, scheduling capable of meeting the URLLC requirements may be carried out.

<LTE V2X Communication>

In the typical LTE system, a radio channel and radio protocol have been designed for inter-UE direct communication (i.e., sidelink) for direct communication between UEs and providing a V2X (particularly V2V) service.

In relation to the sidelink, signals (e.g., PSSS/SSSS) and channels (PSBCH, PSDCH, PSCCH, PSSCH) have been designed. For example, PSSS/SSSS is a synchronization signal for synchronization between a wireless sidelink transmitting end and a receiving end. PSBCH (physical sidelink broadcasting channel) is a channel for transmitting and receiving a sidelink master information block (MIB) related thereto. PSDCH (physical sidelink discovery channel) and PSCCH (physical sidelink control channel) are channels for sidelink control information (SCI) transmission/reception. PSSCH is a physical sidelink shared channel.

Further, to allocate a radio resource for sidelink, two modes have been developed separately. For example, the mode 1 allows the base station to allocate a radio resource, and the mode 2 allows the UE to select and allocate one from a radio resource pool. Further, the LTE system required an additional technical evolution to meet the V2X scenario.

By giving the vehicle access to a mobile communication network (e.g., LTE/LTE-A), the vehicle may be connected to the Internet and to other vehicles. V2X (Vehicle to Everything) communication includes the following four types.

V2V (Vehicle to Vehicle) Communication: Communication between vehicles

V2I (Vehicle to Infrastructure) Communication: Communication between vehicle and infrastructure V2N (Vehicle to Network) Communication: Communication between vehicle and network V2P (Vehicle to Pedestrian) Communication: Communication between vehicle and pedestrian FIG. 13 is a view illustrating an example architecture of a V2X communication system in an LTE system.

Figure 13:
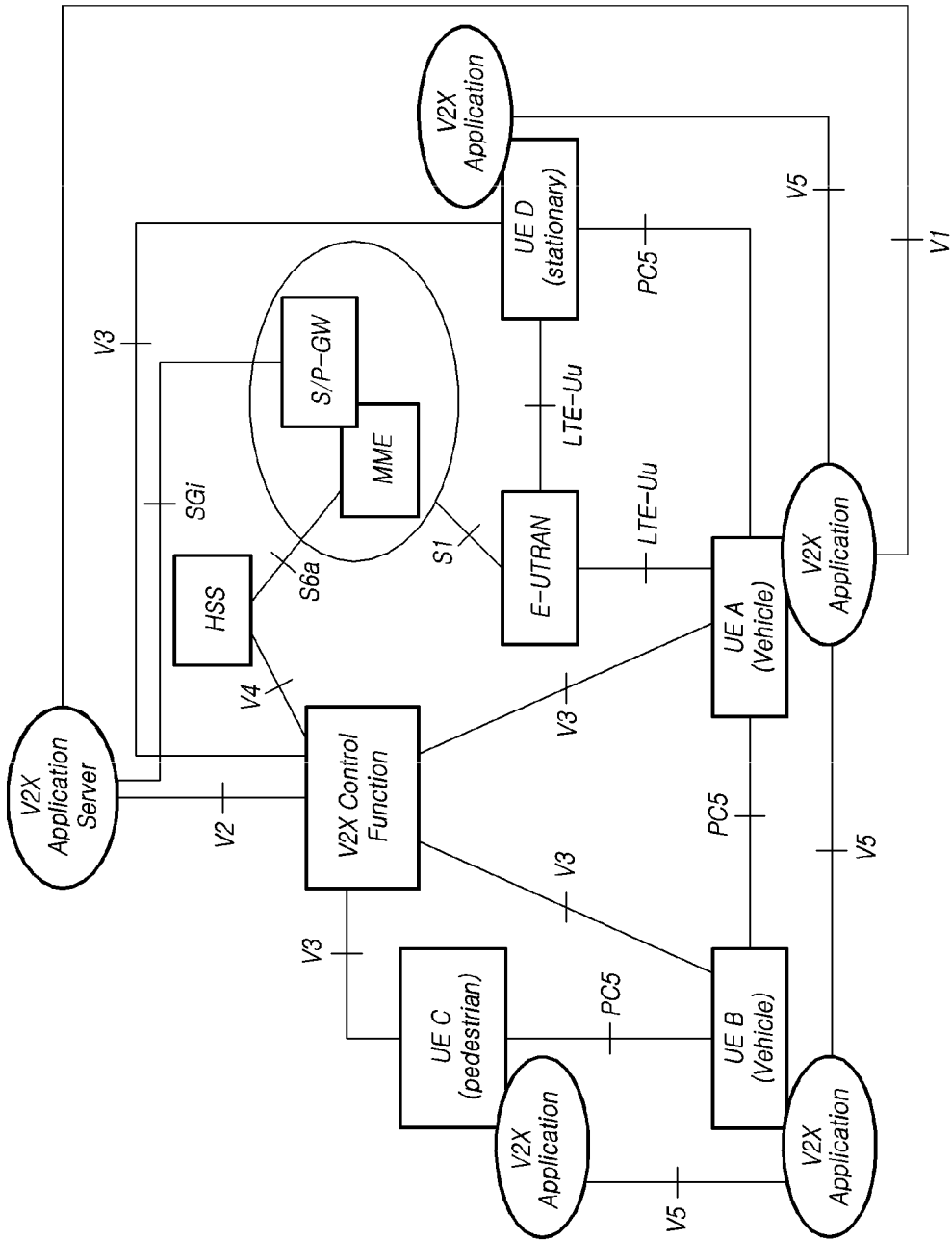
FIG. 13 is a view illustrating an example architecture of a V2X communication system in an LTE system.

Referring to FIG. 13, a V2X service may be provided through a PC5 interface and/or Uu interface. Support via the PC5 interface was provided via V2X sidelink communication.

Specifically, various V2X communication UEs (UEs A to D) are linked through the PC5 interface, and the V2X communication UE and the V2X control function are linked through the V3 interface. Further, the V2X application server and the V2X application of each V2X communication UE are linked through the V1 interface. The V2X communication UE is linked with the base station (E-UTRAN) through the Uu interface, and the base station is linked with the core network (MME and S/P GW) through the S1 interface. The MME and S/P GW are linked with the HSS through the S6a interface, and the HSS is linked with the V2X control function through the V4 interface. The core network entity is linked with the V2X application server through the SGi interface. Meanwhile, the respective V2X applications of the V2X communication UEs are linked to each other through the V5 interface.

In the typical LTE system, resource allocation by the UE supporting V2X sidelink communication supported the following two modes.

Scheduled resource allocation: RRC connection is required for data transmission. The UE requests transmission resource allocation from the base station, and the base station allocates a transmission resource for transmission of sidelink control information and data. The UE transmits a scheduling request and following sidelink BSR to the base station. The base station schedules a transmission resource for sidelink communication using a configured SL-RNTI. For convenience of description, the resource allocation mode in which the base station allocates a sidelink resource is referred to as a first mode. This is merely for convenience of description and may be replaced with other names (sidelink Mode 1 for D2D, sidelink Mode 3 for V2X).

UE autonomous resource allocation: the UE itself selects a resource from a pre-configured sidelink resource pool and selects a transmission format for transmission of sidelink control information and data. If a resource pool is selected, the selection is effective during the overall sidelink control period. If the period ends, the UE may reselect a resource pool. For convenience of description, the resource allocation mode in which the UE selects a sidelink resource according to a predetermined criterion from the sidelink resource pool is referred to as a second mode (sidelink Mode 2 for D2D, sidelink Mode 4 for V2X). However, the embodiments are not limited thereto. For example, such a second mode may be replaced with another term.

Further, the above-described first mode and second mode cannot simultaneously be applied in the same time period. In other words, any typical UE may be operated only according to either the first mode or the second mode in any time.

In D2D communication such as public safety, both the modes (mode 1 and mode 2) share the same resource allocation structure. Data transmission is scheduled in a PSCCH period. A set of subframes in this period is used for PSCCH transmission. Another set of subframes is used for PSSCH transmission. The PSCCH including scheduling control information for one corresponding PSSCH is transmitted always before PSSCH data.

In V2X communication, in two modes (mode 3 and mode 4), a resource allocation structure totally different from the two modes of D2D communication is used to allocate PSCCH and PSSCH. First, there is no PSCCH period to allow two physical channels (PSCCH and PSSCH) to be distributed and transmitted in different periods. The PSCCH and the PSSCH are separated in the frequency domain. In SCI format 1, PSSCH transport blocks corresponding to two identical SCIs may be transmitted in the same subframe. The transport block may be transmitted once or twice. When transmitted twice, the receiver provides combining for the redundancy version of the PSSCH transport block.

For sidelink communication when the UE is out of coverage of the base station/cell, one set of transmission and reception resource pools for sidelink control information may be preconfigured in the UE. Further, one set of transmission and reception resource pools for sidelink data information may be preconfigured in the UE. Even when some UEs are in coverage, and some UEs are out of coverage, they should be able to perform sidelink communication. To that end, all the UEs should be configured with a resource pool for reception sidelink control information with a union of all used resource pools to transmit sidelink control information from the serving cell, neighbor cell, and out-of-coverage (i.e., pre-configured transmission resource pools). Accordingly, the UE's power consumption increases to receive sidelink control information.

NR V2X

3GPP has approved the NR V2X study items to support advanced V2X services, such as vehicles platooning, extended sensors, advanced driving, and remote driving based on NR. NR V2X is not intended to replace the service provided by LTE V2X and assumes to supplement LTE V2X for enhanced V2X service and support interworking with LTE V2X. Further, the corresponding item supports sidelink unicast, sidelink groupcast, and sidelink broadcast transmission types.

The NR V2X resource allocation scheme may support i) the first mode in which the base station performs scheduling for communication resources between UEs and ii) the second mode in which the UE autonomously selects resources from the resource pool. Further, the second mode may be divided into one or more of the sub-divided types as follows.

Mode 2-a: UE autonomously selects sidelink resource for transmission.

Mode 2-b: UE assists sidelink resource selection for other UE(s).

Mode 2-c: UE is configured with NR configured grant (type-1 like) for sidelink transmission.

Mode 2-d: UE schedules sidelink transmissions of other UEs

As such, NR V2X is also expected to basically follow the typical LTE V2X resource allocation scheme. Further, a similar type of transmission and reception scheme is expected to be applied. Therefore, the reception UE has a burden of continuously monitoring the sidelink reception resource pool in all resource pools for sidelink communication. As a method to address this issue, application of the DRX function on the sidelink may be considered. However, no specific method has been provided for this. Further, in the mode scheduled by the base station, the transmission UE should receive a scheduling (e.g., sidelink grant) for sidelink communication from the base station. In this case, no method has been provided for power-efficiently receiving the sidelink grant.

In order to overcome the drawback described above, the present disclosure introduces a method and device for power-efficiently transmitting and receiving data by a sidelink communication UE. Further, the present disclosure introduces a method for the transmission UE to power-efficiently provide sidelink communication.

In the following description, the above-described vehicle communication, V2X communication, and D2D communication are collectively referred to as sidelink communication, but this is merely for convenience of description, it should be understood as encompassing all operations for transmission and reception of data between UEs. Further, the above-described first mode and second mode are merely for a better understanding and any different resource allocation schemes may correspond to the first and second modes, with the disclosure applicable thereto. Further, there may be any two or more resource allocation schemes. Although two resource allocation schemes are described herein as an example, the same may also be applied where three or more modes are present.

Meanwhile, the present embodiments may be applied to sidelink communication between an NR UE and an NR UE through an NR base station. Or, the present embodiments may be applied to sidelink communication between an NR UE and an LTE UE through an NR base station. Or, the present embodiments may be applied to sidelink communication between an LTE UE and an LTE UE through an NR base station. Or, the present embodiments may be applied to sidelink communication between an LTE UE and an LTE UE through an LTE base station. Or, the present embodiments may be applied to sidelink communication between an LTE UE and an NR UE through an LTE base station. Or, the present embodiments may be applied to sidelink communication between an NR UE and an NR UE through an LTE base station. Or, the present embodiments may be applied to LTE UEs connected to an eLTE base station connected through a 5G system (or 5G core network). Or, the present embodiments may be applied to E-UTRAN NR dual connectivity (EN-DC) UEs or NR E-UTRAN dual connectivity (NE-DC) UEs simultaneously providing LTE and NR wireless connections.

The following description is based on unicast-type sidelink communication for convenience of description. This is merely for convenience of description. The embodiments of the disclosure are likewise applicable to groupcast or broadcast schemes. For example, DRX parameters for unicast and DRX parameters for groupcast or broadcast may be separately practiced, which also belongs to the category of the present embodiments. Further, the embodiments may also be applied to any sidelink-based application (e.g., public safety, IoT, or commercial D2D) communication as well as sidelink-based V2X communication. Meanwhile, in the disclosure, feedback information for transmission data is described as HARQ information or HARQ feedback information, and there is no limitation on the terminology.

First, an operation of UE for monitoring the PDCCH discontinuously will be described. An operation of the UE for monitoring the PSCCH discontinuously will be follow.

Figure 14:
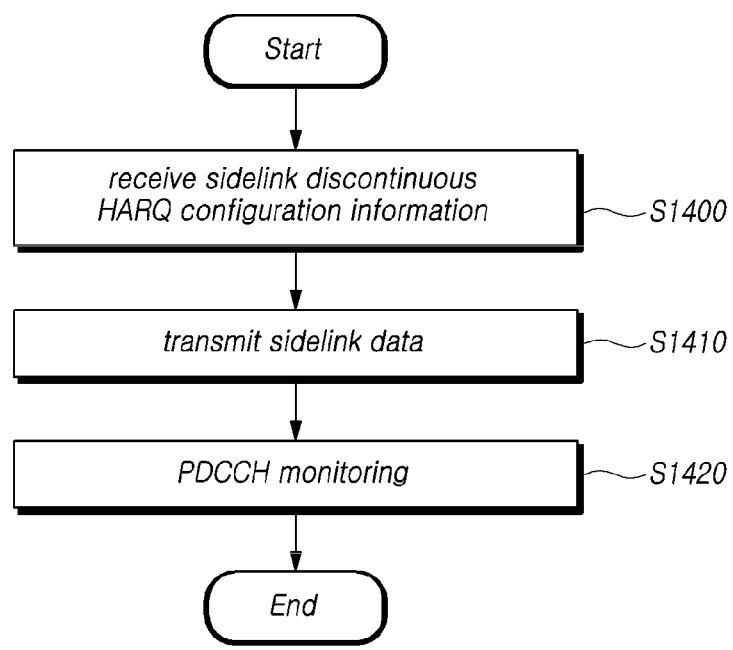
FIG. 14 is a flowchart for describing operations of a UE according to an embodiment.

FIG. 14 is a flowchart for describing operations of a UE according to an embodiment.

Referring to FIG. 14, a UE performing sidelink communication may perform the step of receiving, from a base station, sidelink discontinuous hybrid automatic repeat request (HARQ) configuration information used for monitoring a physical downlink control channel (PDCCH) for a sidelink HARQ operation. (S1400).

For example, the UE may receive, from the base station, sidelink discontinuous HARQ configuration information used when performing the HARQ operation by performing sidelink communication. For example, the sidelink discontinuous HARQ configuration information may be received from the base station through higher layer signaling or system information.

The UE performing sidelink communication may need to transmit HARQ information for sidelink data to the base station according to a sidelink radio resource allocation scheme or according to an arbitrary setting.

According to an embodiment, when the UE is dynamically allocated a sidelink radio resource by the base station and transmits sidelink data to another UE, the UE transmits, to the base station, HARQ feedback information (e.g., one or more pieces of information among HARQ information including SL HARQ process ID, ACK/NACK) about the sidelink data transmission through the PUCCH or PUSCH. This is because, when sidelink data is not normally transferred to another UE, a sidelink radio resource for retransmission should be reallocated from the base station.

According to another embodiment, the UE may transmit HARQ feedback information for sidelink data transmission/reception to the base station according to the setting or instruction of the base station.

In this case, to prevent unnecessary power consumption of the UE, the base station may configure the sidelink discontinuous HARQ configuration information to the UE.

The UE may perform the step of transmitting sidelink data (S1410).

The UE performing sidelink communication transmits sidelink data to another UE. In this case, the sidelink data may be transmitted by a unicast scheme, a multicast scheme, or a broadcast scheme.

Sidelink data may be transmitted through PSCCH or PSSCH, and there is no limitation, such as control data or user data.

The UE may receive HARQ feedback information about the transmitted sidelink data from another UE. However, the HARQ feedback operation for sidelink data may be activated or deactivated. For example, HARQ feedback information indicating NACK may be received only when sidelink data is not normally received by another UE. Alternatively, the HARQ feedback operation may not be performed regardless of whether sidelink data is normally received.

If necessary, the UE may transmit HARQ feedback information for sidelink data to the base station. For example, when the UE receives HARQ feedback information from another UE, the UE may indicate it to the base station. As another example, the UE may indicate to the base station only when HARQ feedback information indicating NACK is received from another UE. As still another example, even when the UE receives HARQ feedback information from another UE, the UE may not indicate it to the base station.

The UE may perform the step of monitoring the PDCCH in the PDCCH discontinuous monitoring period, which is set based on the DRX (discontinuous reception) parameter included in the sidelink discontinuous HARQ configuration information (S1420).

For example, when the UE indicates HARQ feedback information indicating NACK to the base station, the UE should receive sidelink resource allocation information for retransmission of sidelink data from the base station. Therefore, the UE needs to monitor the reception of the PDCCH transmitted from the base station. However, as described above, to prevent power consumption of the UE, the UE monitors whether the PDCCH is received in the PDCCH discontinuous monitoring period.

The sidelink discontinuous HARQ configuration information may include a discontinuous reception (DRX) parameter for monitoring the PDCCH in the PDCCH discontinuous monitoring period.

According to an embodiment, the DRX parameter may include a discontinuous reception HARQ RTT sidelink timer for specifying the start point of the PDCCH discontinuous monitoring period for monitoring the PDCCH including sidelink resource allocation information for HARQ retransmission of sidelink data. According to another embodiment, the DRX parameter may include the discontinuous reception retransmission sidelink timer for specifying the end point of the PDCCH discontinuous monitoring period. According to still another embodiment, the DRX parameter may include both the discontinuous HARQ RTT sidelink timer and the discontinuous reception retransmission sidelink timer. Here, the timer may mean a corresponding timer value.

The UE sets a PDCCH discontinuous monitoring period which is set discontinuously using the above-described timer and monitors whether the PDCCH is received.

For example, after transmitting sidelink data, the UE starts the discontinuous reception HARQ RTT sidelink timer and stops the discontinuous reception retransmission sidelink timer. If the discontinuous reception HARQ RTT sidelink timer expires, the UE starts the discontinuous reception retransmission sidelink timer. The UE monitors the PDCCH only when the discontinuous reception retransmission sidelink timer operates. In other words, the case where the discontinuous reception retransmission sidelink timer operates may mean the PDCCH discontinuous monitoring period. In other words, the discontinuous reception HARQ RTT sidelink timer may mean a standby time up to the start of PDCCH monitoring.

Meanwhile, the discontinuous reception retransmission sidelink timer may start if a preset event occurs after the discontinuous reception HARQ RTT sidelink timer expires.

For example, the preset event may be set to any one of i) when sidelink data is not successfully transmitted, ii) when receiving HARQ feedback information indicating failure in transmission of sidelink data, and iii) when transmitting, to the base station, HARQ feedback information indicating failure in transmission for sidelink data.

For example, the UE may not normally transmit sidelink data. In this case, if the discontinuous reception HARQ RTT sidelink timer expires, it may start the discontinuous reception retransmission sidelink timer.

According to another embodiment, the UE may receive, from another UE, HARQ feedback information indicating NACK for the sidelink data. If the HARQ RTT sidelink timer expires, the UE may initiate the discontinuous reception retransmission sidelink timer.

According to still another embodiment, in the case where the UE may receive HARQ feedback information indicating NACK for sidelink data from another UE and transmits it to the base station. If the HARQ RTT sidelink timer expires, the UE may initiate the discontinuous reception retransmission sidelink timer.

The value of the discontinuous reception HARQ RTT sidelink timer may be dynamically set depending on what condition a preset event related to the start time of the discontinuous reception retransmission sidelink timer has been set.

If receiving the PDCCH for retransmission of sidelink data in the PDCCH discontinuous monitoring period, the UE retransmits, to another UE, sidelink data based on the sidelink resource allocation information on the PDCCH.

By the above-described operation, the UE may discontinuously perform base station PDCCH monitoring which is carried out while the sidelink communication is performing. Accordingly, the UE may efficiently perform sidelink communication with minimum UE power consumption.

Figure 15:
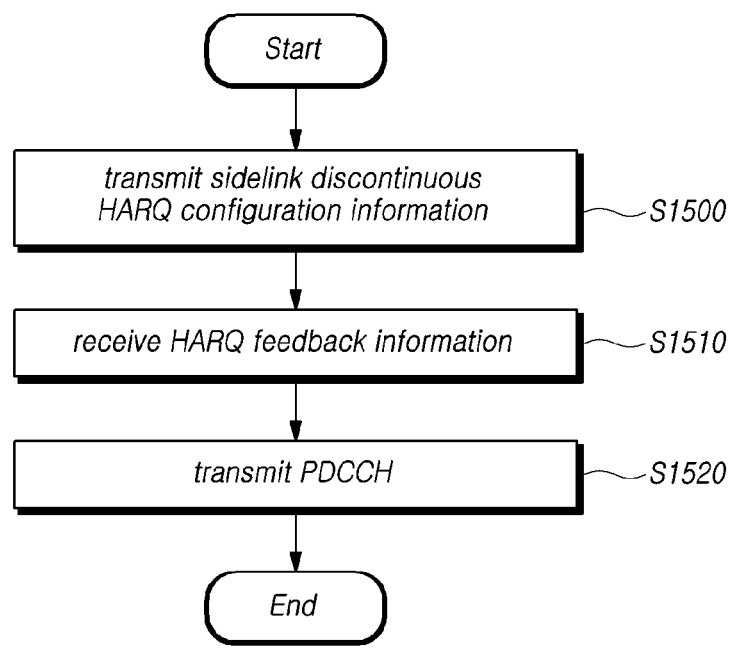
FIG. 15 is a flowchart for describing operations of a base station according to an embodiment.

FIG. 15 is a flowchart for describing operations of a base station according to an embodiment.

Referring to FIG. 15, the base station controlling sidelink communication may perform the step of transmitting sidelink discontinuous HARQ configuration information used for physical downlink control channel (PDCCH) monitoring for sidelink HARQ operation to the UE.

For example, the sidelink non-continuous HARQ configuration information may be transmitted through higher layer signaling or system information. The sidelink discontinuous HARQ configuration information may be for DRX operation between the UE and the symbol and may be distinguished from information for DRX operation in sidelink communication between the UE and another UE. Similarly, it may also be distinguished from the DRX parameter for Uu interface communication between the base station and the UE, not sidelink communication.

The base station may perform the step of receiving HARQ feedback information about sidelink data transmission from the UE (S1510).

The UE may transmit sidelink data to another UE and receive HARQ feedback information about sidelink data from another UE according to a setting. In this case, the sidelink data may be transmitted by a unicast scheme, a multicast scheme, or a broadcast scheme. Sidelink data may be transmitted through PSCCH or PSSCH, and there is no limitation, such as control data or user data.

However, the HARQ feedback operation for sidelink data may be activated or deactivated. For example, HARQ feedback information indicating NACK may be received only when sidelink data is not normally received by another UE. Alternatively, the HARQ feedback operation may not be performed regardless of whether sidelink data is normally received.

If necessary, the base station may receive HARQ feedback information about sidelink data from the UE. According to an embodiment, the base station may receive HARQ feedback information received by the UE from another UE. According to another embodiment, the base station may receive HARQ feedback information from the UE only when the HARQ feedback information received by the UE from another UE indicates NACK. According to still another embodiment, although the UE receives HARQ feedback information from another UE, the base station may not receive information thereabout.

The base station may perform the step of transmitting the PDCCH including sidelink resource allocation information for HARQ retransmission of sidelink data in the PDCCH discontinuous monitoring period of the UE, set based on the discontinuous reception (DRX) parameter included in the sidelink discontinuous HARQ configuration information (S1520).

For example, if the HARQ feedback information received from the UE indicates NACK, the base station may transmit sidelink resource allocation information for sidelink data retransmission to the UE. The sidelink resource allocation information may be transmitted through the PDCCH, but this is exemplary, and it may be transferred through various downlink channels, e.g., PDSCH.

The PDCCH including sidelink resource allocation information may be transmitted to the UE in the PDCCH discontinuous monitoring period.

The PDCCH discontinuous monitoring period may be determined by the DRX parameter included in the sidelink discontinuous HARQ configuration information.

According to another embodiment, the DRX parameter may include the discontinuous reception HARQ RTT sidelink timer for specifying the start point of the PDCCH discontinuous monitoring period. As still another embodiment, the DRX parameter may include the discontinuous reception retransmission sidelink timer for specifying the end point of the PDCCH discontinuous monitoring period. As yet another embodiment, the DRX parameter may include both the discontinuous HARQ RTT sidelink timer and the discontinuous reception retransmission sidelink timer. Here, the timer may mean a corresponding timer value.

In this case, the UE sets a PDCCH discontinuous monitoring period which is set discontinuously and monitors whether the PDCCH is received.

For example, after transmitting sidelink data, the UE starts the discontinuous reception HARQ RTT sidelink timer and stops the discontinuous reception retransmission sidelink timer. If the discontinuous reception HARQ RTT sidelink timer expires, the UE starts the discontinuous reception retransmission sidelink timer. The UE monitors the PDCCH only when the discontinuous reception retransmission sidelink timer operates. In other words, the case where the discontinuous reception retransmission sidelink timer operates may mean the PDCCH discontinuous monitoring period. In other words, the discontinuous reception HARQ RTT sidelink timer may mean a standby time up to the start of PDCCH monitoring.

Meanwhile, the discontinuous reception retransmission sidelink timer may start if a preset event occurs after the discontinuous reception HARQ RTT sidelink timer expires.

For example, the preset event may be set to any one of when sidelink data is not successfully transmitted, when receiving HARQ feedback information indicating failure in transmission of sidelink data, and when transmitting, to the base station, HARQ feedback information indicating failure in transmission for sidelink data.

For example, the UE may not normally transmit sidelink data. In this case, if the discontinuous reception HARQ RTT sidelink timer expires, it may start the discontinuous reception retransmission sidelink timer.

According to another embodiment, the UE may receive, from another UE, HARQ feedback information indicating NACK for the sidelink data. If the HARQ RTT sidelink timer expires, the UE may initiate the discontinuous reception retransmission sidelink timer.

According to still another embodiment, in the case where the UE may receive HARQ feedback information indicating NACK for sidelink data from another UE and transmits it to the base station. If the HARQ RTT sidelink timer expires, the UE may initiate the discontinuous reception retransmission sidelink timer.

The value of the discontinuous reception HARQ RTT sidelink timer may be dynamically set depending on what condition a preset event related to the start time of the discontinuous reception retransmission sidelink timer has been set.

The base station transmits, to the UE, the PDCCH including sidelink resource allocation information in the set PDCCH discontinuous monitoring period.

By the above-described operation, the UE may discontinuously perform base station PDCCH monitoring which is carried out while the sidelink communication is performing. Accordingly, the UE may efficiently perform sidelink communication through minimum UE power consumption.

The above-described operations of the UE and the base station are described below in greater detail in connection with separate embodiments. The embodiments described below may be practiced individually or in combination.

Embodiment of Defining DRX Parameter for Each SL HARQ Process of Sidelink Transmission UE For each sidelink carrier, one HARQ entity maintaining a plurality of parallel sidelink processes is configured in the MAC entity. One sidelink grant transmitted and configured and HARQ information associated therewith are associated with one sidelink process. The sidelink HARQ entity and the sidelink HARQ process may be shared by all cast types (e.g., unicast, multicast, or broadcast).

Figure 16:
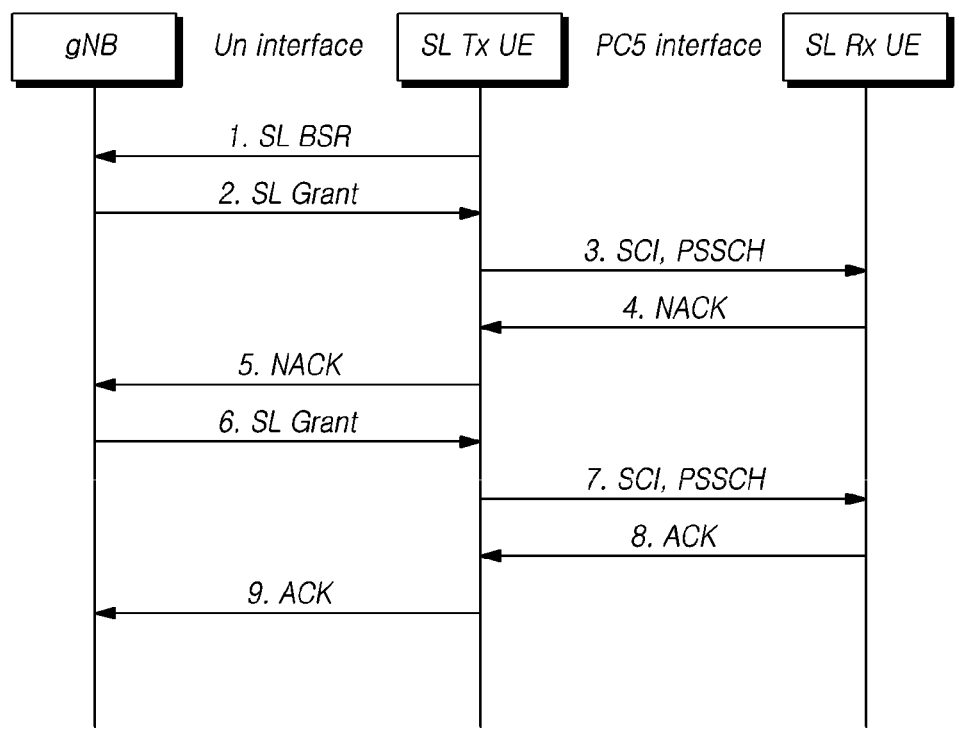
FIG. 16 is a view illustrating a sidelink communication process based on sidelink HARQ feedback according to an embodiment.

FIG. 16 is a view illustrating a sidelink communication process based on sidelink HARQ feedback according to an embodiment.

Hereinafter, with reference to FIG. 16, an example of performing sidelink communication when retransmission is performed based on HARQ feedback on the PC5 interface will be described.

If data is generated to be transmitted through the PC6 interface, the sidelink (SL) transmission (Tx) UE transmits a SL buffer status report (BSR) to the base station. The base station transmits an SL grant to the SL transmission UE through the PDCCH (DCI). The SL grant may include one or more of SL HARQ information for the SL transmission UE and PUCCH resource information for the SL transmission UE to transmit the feedback for SL HARQ transmission indicated through the SL grant to the base station. The HARQ information is composed of one or more information of new data indicator (NDI), transport block size (TBS), redundancy version (RV), and HARQ process ID.

The SL transmission UE transmits sidelink control information (SCI) through the PSCCH. The SCI may include one or more information of the SL HARQ information for SL reception UE and PSCCH/PSFCH resource information for the SL reception UE to transmit, to the SL transmission UE, feedback for the SL HARQ transmission indicated through the SCI. The SL transmission UE transmits data (TB) to the SL reception UE through the PSSCH. If the SL reception UE fails to receive data in the corresponding TB, the SL reception UE may transmit acknowledge (NACK) information (HARQ feedback information) therefor to the SL transmission UE.

The SL transmission UE transmits a NACK to the base station. For example, when the base station configures information for indicating such HARQ feedback to the transmission UE, the SL transmission UE transmits a NACK to the base station. The base station may transmit an SL grant for retransmission to the SL transmission UE.

The transmission UE transmits SCI through the PSCCH. The SL transmission UE transmits data (TB) to the SL reception UE through the PSSCH. If the SL reception UE succeeds in receiving data in the TB, the SL reception UE may transmit acknowledge (ACK) information thereabout to the SL transmission UE. The SL transmission UE transmits a ACK to the base station.

In the case of unicast and groupcast communication, each TB transmitted from the transmission UE is associated with cast type, source ID, destination ID, and HARQ processor ID. The MAC entity of the transmission UE may receive sidelink HARQ feedback (e.g., ACK or NACK) from the sidelink physical layer.

For the transmission UE, HARQ feedback may be enabled/disabled per HARQ process, per sidelink radio bearer, per logical channel, or per logical channel group. The enable/disable information about the HARQ feedback may be indicated by the base station through RRC dedicated information or system information.

For PDCCH monitoring operation control identified by any SL RNTI (e.g., SL-RNTI or SL-V-RNTI) of the MAC entity of the transmission UE, the DRX configuration may be indicated by RRC.

Here, the SL RNTI indicates the RNTI configured by the UE for mode 1 scheduling. Two different UE-specific SN RNTIs may be configured to the UE. One is for CRC scrambling in DCI for dynamic grant, and the other one is for CRC scrambling in DCI for configured grant type-2.

As described above, the MAC entity of the UE according to the present embodiment may discontinuously monitor the PDCCH using the DRX operation for all activated serving cells if the DRX is configured when it is in the RRC connected state. Otherwise, the MAC entity should monitor the PDCCH as specified in TS38.213.

For such a DRX operation, a new parameter may be defined and indicated by the base station.

According to an embodiment, a DRX parameter for indicating the minimum duration before reception of an SL grant set for HARQ retransmission is expected by the MAC entity of the sidelink transmission UE may be defined per SL HARQ process. Or, a DRX parameter for indicating any duration before reception of an SL grant set for HARQ retransmission is expected by the MAC entity of the sidelink transmission UE may be defined. For convenience of description, this is referred to as discontinuous reception HARQ RTT sidelink (SL) timer or drx-HARQ-RTT-TimerSL. This is merely for convenience of description and may be replaced with another similar term.

According to another embodiment, a DRX parameter for indicating the maximum duration until one SL grant for SL retransmission is received by the MAC entity of the sidelink transmission UE may be defined for each SL HARQ process. For convenience of description, this is referred to as discontinuous reception retransmission sidelink (SL) timer or drx-RetransmissionTimerSL. This is merely for convenience of description and may be replaced with another similar term.

If DRX (DRX cycle) operation is configured in the UE, it may be included in the active time while the discontinuous reception retransmission SL timer operates. The active time may include the following times.

drx-onDurationTimer or drx-InactivityTimer or drx-RetransmissionTimerDL or drx-RetransmissionTimerUL or ra-ContentionResolutionTimer is running; or
  a Scheduling Request is sent on PUCCH and is pending; or
  a PDCCH indicating a new transmission addressed to the C-RNTI of the MAC entity has not been received after successful reception of a Random Access Response for the Random Access Preamble not selected by the MAC entity among the contention-based Random Access Preamble When DRX operation is configured in the UE performing sidelink carrier, the MAC entity may operate as follows.
  1> If one MAC PDU is transmitted in one configured sidelink grant:
    2> drx-HARQ-RTT-TimerSL for the corresponding HARQ process starts. For example, the drx-HARQ-RTT-TimerSL start point may be the first symbol after the end of the first repetition of the corresponding PSSCH (or PSCCH) transmission. Or, the drx-HARQ-RTT-TimerSL start point may be the first symbol after the end of the corresponding PSSCH (or PSCCH) transmission. Or, it may be any point in time.
    2> The drx-RetransmissionTimerSL for the corresponding HARQ process stops.
  1> If drx-HARQ-RTT-TimerSL expires:
    2> drx-RetransmissionTimerSL for the corresponding HARQ process starts. For example, the drx-RetransmissionTimerSL start point may be the first symbol after expiration of drx-HARQ-RTT-TimerSL. Or, it may be any point in time.
  1> If the MAC entity is in active time:
    2> PDCCH is monitored as specified in TS 38.213.
    2> If the PDCCH indicates one SL transmission:
      3> drx-HARQ-RTT-TimerSL for the corresponding HARQ process starts. For example, the drx-HARQ-RTT-TimerSL start point may be the first symbol after the end of the first repetition of the corresponding PSSCH (or PSCCH) transmission. Or, the drx-HARQ-RTT-TimerSL start point may be the first symbol after the end of the corresponding PSSCH (or PSCCH) transmission. Or, it may be any point in time.
      3> The drx-RetransmissionTimerSL for the corresponding HARQ process stops.

The above-described drx-HARQ-RTT-TimerSL should be configured to have a value equal to or longer than the round trip time (RTT) on the UL or DL interface until retransmission after one sidelink transmission as shown in FIG. 16. For example, the drx-HARQ-RTT-TimerSL needs to be set with a timer (timer value) to start after step 2 reception of FIG. 16 and operate until step 6 reception is expected.

Embodiment for Reducing Operation Time of Discontinuous Reception Retransmission Sidelink Timer Meanwhile, while the discontinuous reception retransmission sidelink timer operates may be included in the active time. The active time means a period for monitoring the PDCCH as specified in TS 38.213. In the active time, the UE monitors the PDCCH through contiguous slots. Therefore, the active time should be reduced as possible, to minimize UE power consumption.

For example, the discontinuous reception retransmission sidelink timer may start when a predetermined condition is met.

According to an embodiment, the discontinuous reception retransmission sidelink timer may be configured to start when the transmission UE (MAC entity or HARQ entity or HARQ process) receives sidelink HARQ feedback indicating NACK from the SL physical layer for the corresponding SL HARQ process. Thus, when sidelink HARQ feedback indicates ACK or sidelink HARQ feedback is not received, the discontinuous reception retransmission sidelink timer may not start. Or, if sidelink HARQ feedback indicates ACK, and the discontinuous reception retransmission sidelink timer is operating, the discontinuous reception retransmission sidelink timer may be stopped.

According to another embodiment, the discontinuous reception retransmission sidelink timer may be configured to start when the data of the corresponding SL HARQ process is not successfully transmitted. Thus, if data is successfully transmitted, the discontinuous reception retransmission sidelink timer may not start. Or, if sidelink data is successfully transmitted, and the discontinuous reception retransmission sidelink timer is operating, the discontinuous reception retransmission sidelink timer may be stopped.

According to still another embodiment, the transmission UE (MAC entity or HARQ entity or HARQ process) may receive sidelink HARQ feedback indicating NACK from the SL physical layer for the corresponding SL HARQ process. The transmission UE (MAC entity or physical layer) may transmit sidelink HARQ feedback, as NACK, to the base station as in step 5 of FIG. 16. Step 5 of FIG. 16 may be provided through any physical channel (e.g., PUCCH or PUSCH). The discontinuous reception retransmission sidelink timer may be configured to start when the transmission UE indicates the sidelink HARQ feedback, as NACK, to the base station, for the corresponding SL HARQ process. Thus, the discontinuous reception retransmission sidelink timer may not start when the transmission UE does not transmit the sidelink HARQ feedback indicating NACK to the base station or until it is transmitted. Or, if the transmission UE transmits sidelink HARQ feedback indicating ACK to the base station, and the discontinuous reception retransmission sidelink timer is operating, the discontinuous reception retransmission sidelink timer may be stopped.

According to an embodiment, when the DRX operation is configured in the UE, the MAC entity may operate as follows.

1> If drx-HARQ-RTT-TimerSL expires:
2> If the data of the corresponding HARQ process is not transmitted successfully:
3> drx-RetransmissionTimerSL for the corresponding HARQ process starts. For example, the drx-RetransmissionTimerSL start point may be the first symbol after expiration of drx-HARQ-RTT-TimerSL. Or, the drx-RetransmissionTimerSL start point may be any time.

According to another embodiment, when the DRX operation is configured in the UE, the MAC entity may operate as follows.

1> If drx-HARQ-RTT-TimerSL expires:
2> If receiving HARQ feedback indicating that data transmission of the corresponding HARQ process fails:
3> drx-RetransmissionTimerSL for the corresponding HARQ process starts. For example, the drx-RetransmissionTimerSL start point may be the first symbol after expiration of drx-HARQ-RTT-TimerSL. Or, the drx-RetransmissionTimerSL start point may be any time.

As another example, when the DRX is configured in the UE, the MAC entity may operate as follows.

1> If drx-HARQ-RTT-TimerSL expires:
2> If transmitting HARQ feedback indicating that data transmission of the corresponding HARQ process fails (or if requesting retransmission, or a predetermined offset/duration (indicated by the base station) after HARQ feedback is transmitted to the base station);
3> drx-RetransmissionTimerSL for the corresponding HARQ process starts. The drx-RetransmissionTimerSL start point may be the first symbol after expiration of drx-HARQ-RTT-TimerSL. Or, the drx-RetransmissionTimerSL start point may be any time.

By the above-described operation, it is possible to minimize the operation time of the drx-RetransmissionTimerSL timer to thereby prevent unnecessary power consumption of the UE. The above-described predetermined offset/duration may be indicated to the UE through RRC signaling or DCI by the base station.

Meanwhile, the UE performing sidelink communication may perform DRX operation in communication with another UE, as well as communication with the base station.

As another embodiment of the UE and base station performing the above-described operations, an additional embodiment in which the UE and base station perform DRX operation is described below. The following embodiment and the foregoing embodiment may be practiced in any combination thereof.

Figure 17:
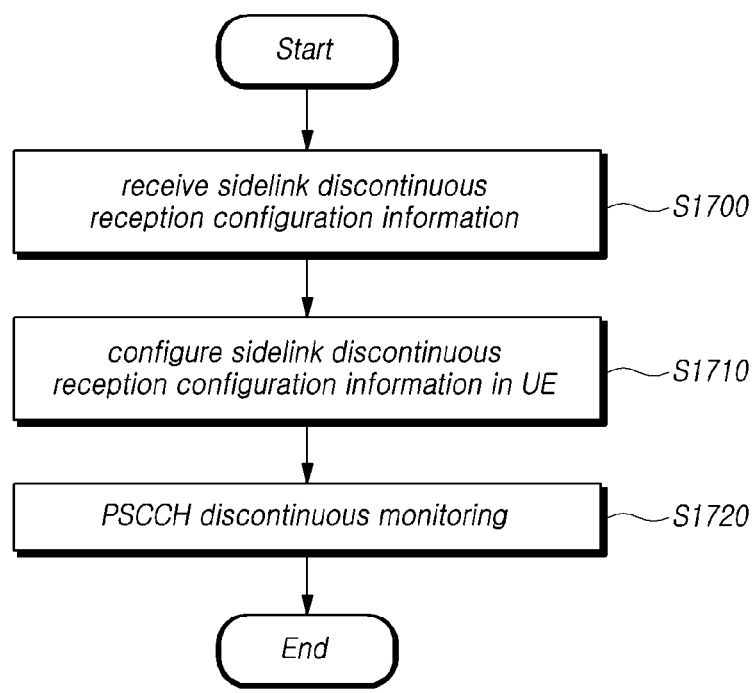
FIG. 17 is a flowchart for describing operations of a UE according to another embodiment.

FIG. 17 is a flowchart for describing operations of a UE according to another embodiment.

Referring to FIG. 17, a method for performing sidelink communication by a UE may include receiving sidelink non-continuous reception configuration information (S1700).

For example, sidelink discontinuous reception configuration information may include information necessary for the UE performing sidelink communication to apply the DRX operation to PSCCH reception. To that end, the sidelink discontinuous reception configuration information may be received in various manners. The UE, receiving the sidelink discontinuous reception configuration information, may be a UE which is in the state of any one of RRC connected, RRC idle, and RRC inactive.

According to an embodiment, the sidelink discontinuous reception configuration information may be included in the system information transmitted from the base station. For example, the system information may be included in a sidelink-specific system information block (SIB) or a conventional SIB transmitted from the base station. The system information may include sidelink radio bearer (SLRB) information.

According to another embodiment, the sidelink discontinuous reception configuration information may be included in an RRC message transmitted from the transmission UE transmitting the PSCCH or the base station. For example, the base station may transmit discontinuous reception configuration information to each UE through the RRC message. Or, the transmission UE, transmitting sidelink communication data, may transmit the discontinuous reception configuration information to the reception UE.

The method for performing sidelink communication by the UE may include configuring the UE with the sidelink non-continuous reception configuration information (S1710).

For example, the UE, receiving the sidelink discontinuous reception configuration information, may be configured with the DRX parameters included in the sidelink discontinuous reception configuration information. The DRX parameters may be configured separately with respect to at least one of sidelink carrier, sidelink resource pool, UE, MAC entity, UE group, and session. For example, DRX parameters may be configured per sidelink carrier, per sidelink resource pool, per UE, per MAC entity, per UE group, or per session.

According to an embodiment, the DRX parameters may include at least one information of a sidelink discontinuous reception HARQ RTT timer, a sidelink discontinuous reception retransmission timer, a sidelink discontinuous reception on-duration timer, and a sidelink discontinuous reception inactivity timer. Each information included in the DRX parameter may be configured with a different value from that of the DRX parameter configured for the UE to perform communication with the base station.

The method for performing sidelink communication by the UE may include discontinuously monitoring the physical sidelink control channel (PSCCH) based on the discontinuous reception (DRX) parameter included in the sidelink discontinuous reception configuration information (S1720).

For example, the UE discontinuously monitors the PSCCH based on the DRX parameter, determining whether there is sidelink communication data for the UE. Further, the transmission UE transmits a PSCCH in the time period that the reception UE monitors based on the DRX parameter.

Or, the UE determines a PSCCH discontinuous monitoring operation based on whether sidelink HARQ is activated. For example, the UE may apply the DRX parameter separately for where the HARQ for sidelink data is activated or where the HARQ is deactivated, determining whether to monitor the PSCCH. Whether the HARQ is activated may be controlled by sidelink control information or by any method.

As described, the sidelink communication UE may prevent drastic increase in power consumption according to the embodiments. Hereinafter, operations of a peered base station will be described with reference to the drawings.

Figure 18:
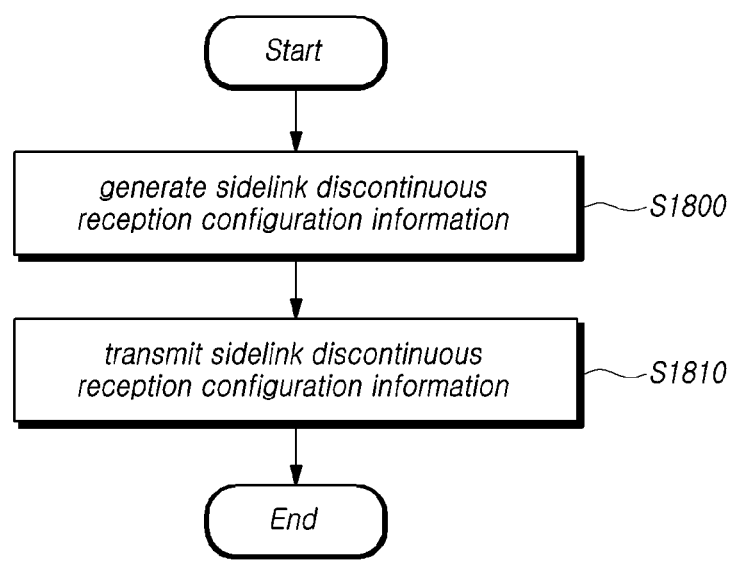
FIG. 18 is a flowchart for describing operations of a base station according to another embodiment.

FIG. 18 is a flowchart for describing operations of a base station according to another embodiment.

Referring to FIG. 18, a method for controlling sidelink communication by a base station may include generating sidelink discontinuous reception configuration information (S1800).

For example, sidelink discontinuous reception configuration information may include information necessary for the UE performing sidelink communication to apply the DRX operation to PSCCH reception.

For example, the sidelink discontinuous reception configuration information may include DRX parameters. The DRX parameters may be configured separately with respect to at least one of sidelink carrier, sidelink resource pool, UE, MAC entity, UE group, and session. For example, DRX parameters may be configured per sidelink carrier, per sidelink resource pool, per UE, per MAC entity, per UE group, or per session.

According to an embodiment, the DRX parameters may include at least one information of a sidelink discontinuous reception HARQ RTT timer, a sidelink discontinuous reception retransmission timer, a sidelink discontinuous reception on-duration timer, and a sidelink discontinuous reception inactivity timer. Each information included in the DRX parameter may be configured with a different value from that of the DRX parameter configured for the UE to perform communication with the base station.

The method for controlling sidelink communication by the base station may include transmitting the sidelink discontinuous reception configuration information to the UE (S1810).

The sidelink discontinuous reception configuration information may be transmitted in various manners. The UE, receiving the sidelink discontinuous reception configuration information, may be a UE which is in the state of any one of RRC connected, RRC idle, and RRC inactive.

According to an embodiment, the sidelink discontinuous reception configuration information may be included in the system information. For example, the system information may be included in a sidelink-specific system information block (SIB) or a conventional SIB transmitted from the base station. The system information may include sidelink radio bearer (SLRB) information.

According to another embodiment, the sidelink discontinuous reception configuration information may also be included in an RRC message. For example, the base station may transmit discontinuous reception configuration information to each UE through the RRC message.

According to another embodiment, the transmission UE, transmitting sidelink communication data, may transmit the discontinuous reception configuration information to the reception UE.

Meanwhile, the UE discontinuously monitors the physical sidelink control channel (PSCCH) based on the discontinuous reception (DRX) parameter included in the sidelink discontinuous reception configuration information. For example, the UE, receiving the sidelink discontinuous reception configuration information, may be configured with the DRX parameters included in the sidelink discontinuous reception configuration information.

The UE discontinuously monitors the PSCCH based on the DRX parameter, determining whether there is sidelink communication data for the corresponding UE. Further, the transmission UE transmits a PSCCH in the time period where the reception UE monitors based on the DRX parameter.

Or, the UE determines a PSCCH discontinuous monitoring operation based on whether sidelink HARQ is activated. For example, the UE may apply the DRX parameter separately for where the HARQ for sidelink data is activated or where the HARQ is deactivated, determining whether to monitor the PSCCH. Whether the HARQ is activated may be controlled by sidelink control information or by any method.

Hereinafter, more detailed embodiments for the above-described operations of the base station and the UE will be described below in various manners. The embodiments described below may be combined in various manners and be performed by the base station or the UE. Further, to perform each embodiment below, any step may be added to the above-described operations of the base station or any step thereof may be omitted or modified.

The embodiments described below may be practiced individually or in combination.

Configuration of Parameter for Discontinuous Reception (DRX) on Sidelink Per Sidelink Carrier/Per Resource Pool/Per UE/Per MAC Entity/Per Group/Per Session As described above, in the typical sidelink technology, the UE was supposed to continuously monitor all resource pools where sidelink control information (SCI) could be transmitted. To that end, the sidelink UE may be enabled to support discontinuous reception to save power consumption according to an embodiment.

For example, the UE (or reception UE) may be configured (or pre-configured) with parameters for discontinuous reception for at least one of a specific cell/carrier/frequency, specific resource pool, specific UE, specific MAC entity (e.g. MCG MAC, SCG MAC) and a specific group/groupcast session (e.g. L1 source ID, L1 destination ID, L2 source ID, L2 destination ID, any combination thereof (e.g. L1 source ID and L1 destination ID)) and a specific broadcast session (e.g. L1 source ID, L1 destination ID, L2 source ID, L2 destination ID, or any combination thereof (e.g. L1 source ID and L1 destination ID)).

According to an embodiment, the reception UE may perform discontinuous reception operation on at least one of the corresponding cell/carrier/frequency, the corresponding resource pool, the corresponding UE, the corresponding MAC entity, the corresponding group/groupcast session and the corresponding broadcast session, according to the configured discontinuous reception parameter. According to another embodiment, the reception UE may perform discontinuous reception operation on at least one of any cell/carrier/frequency, any resource pool, any UE, any MAC entity, any group/groupcast session and any broadcast session, according to the configured discontinuous reception parameter.

According to another embodiment, the UE (or reception UE) may be configured (or preconfigured) with a parameter for discontinuous reception commonly applied to at least one of any cell/carrier/frequency, any resource pool, any UE, any MAC entity, any group/groupcast session and any broadcast session. The reception UE may perform discontinuous reception operation according to the configured discontinuous reception parameter.

One or more of the following embodiments may be applied to the above-described sidelink discontinuous reception parameter.

Embodiment of Indicating Discontinuous Reception Parameter Through Sidelink-Specific SIB for RRC IDLE/RRC Inactive UE For example, for the RRC idle/RRC inactive UE or to indicate (e.g., instruct) a specific default operation of the RRC connected UE, the base station may indicate (e.g., provide transmit) the discontinuous reception parameter (DRX parameter). The base station may provide discontinuous reception configuration information (DRX configuration information, hereinafter referred to below as SL-DRX-Config for convenience of description) for sidelink communication. The base station may control the UE's PSCCH monitoring operation through sidelink-specific system information (or cell-specific SIB or any SIB).

For example, when the RRC idle/RRC inactive UE monitors the PSCCH through the sidelink communication reception resource pool (or when the RRC idle/RRC inactive UE monitors the PSCCH pool or when the RRC idle/RRC inactive UE monitors the PSCCH resource), the discontinuous reception parameter may be configured based on the SIB configuration. The base station may provide a sidelink radio bearer (SLRB). The base station may instruct the UE to map the PC5 QoS profile to the SLRB through a sidelink-specific SIB (or cell-specific SIB or any SIB). When the RRC idle/RRC inactive UE initiates transmission of a new PC5 QoS flow, an SLRB associated with the PC5 QoS profile may be configured based on the SIB configuration.

Embodiment in which Transmission UE (Tx UE) Indicates Discontinuous Reception Parameter to Reception UE (Rx UE) Through RRC Signaling According to an embodiment, a specific UE may discover another UE through a sidelink, and an inter-UE direct link may be set up through the higher layer protocol (e.g., PC5 signaling protocol) of TS23.303. In this state, if a packet to be transmitted through sidelink is generated, the higher layer of the transmission UE maps the packet to be transmitted to the PC5 QoS flow as per the PC5 QoS rule. The transmission UE transfers the packet to be transmitted, along with the associated QoS flow identifier (e.g., PC5 QFI), to the access stratum (AS). The transmission UE may request an SLRB configuration from the base station. The SLRB request, which is transmitted through the uplink RRC message, includes the PC5 QoS flow identifier.

According to an embodiment, the transmission UE may request the SLRB configuration to the base station, through the sidelink UE information message transmitted for the UE interested in sidelink transmission to request a sidelink resource. According to another embodiment, the transmission UE may send a request for SLRB configuration to the base station through any uplink RRC message. The base station indicates (e.g., provide) the SLRB configuration to the transmission UE. The corresponding SLRB configuration information may include one or more information of the SLRB mapping to the QoS flow, PDCP/RLC/LCH configurations and the sidelink cell/carrier configuration through which the corresponding SLRB data is to be transmitted/received. Meanwhile, the transmission UE may configure an SLRB. The transmission UE may transmit an RRC message including the SLRB configuration to the reception UE. The reception UE may configure an SLRB. The reception UE may transmit an acknowledge message to the transmission UE. The transmission/reception UE may transmit/receive data through the sidelink.

According to still another embodiment, the transmission UE may request an SLRB configuration to the base station. The base station indicates (e.g., provides) the SLRB configuration to the transmission UE. The base station indicates (e.g., provides) the SLRB configuration directly to the reception UE peered to the transmission UE (having a direct link through the sidelink). The corresponding SLRB configuration information may include one or more information of the SLRB mapping to the QoS flow, PDCP/RLC/LCH configurations and the sidelink cell/carrier configuration through which the corresponding SLRB data is to be transmitted/received. The transmission UE may configure an SLRB. The reception UE may configure an SLRB. The transmission UE may transmit an acknowledge message to the base station. The reception UE may transmit an acknowledge message to the base station. The transmission/reception UE may transmit/receive data through the sidelink.

According to yet another embodiment, the transmission UE in the RRC idle/RRC inactive state may transmit an RRC message including the SLRB configuration to the reception UE. The reception UE may configure an SLRB. The reception UE may transmit an acknowledge message to the transmission UE. The transmission/reception UE may transmit/receive data through the sidelink. Information for the SLRB configuration in the RRC idle/RRC inactive state may be received through system information. The base station may provide a sidelink radio bearer (SLRB). Through this, the base station may instruct to map the PC5 QoS profile to the SLRB through a sidelink-specific SIB (or cell-specific SIB or any SIB). When the RRC idle/RRC inactive UE initiates transmission of a new PC5 QoS flow, an SLRB associated with the PC5 QoS profile may be configured based on the SIB configuration.

When the transmission UE requests the SLRB configuration to the base station, when the UE interested in sidelink transmission transmits a sidelink UE information message for requesting a sidelink resource to the base station, when the base station indicates (e.g., provides, transmits) the SLRB configuration to the transmission UE, when the transmission UE transmits the SLRB configuration to the reception UE, or when the base station indicates the SLRB configuration to the reception UE, the corresponding RRC message may include parameter information for discontinuous reception. The corresponding RRC message may include one or more PSCCH resource configuration information. The corresponding RRC message may include the discontinuous parameter value preferred/requested/expected by the UE. The corresponding RRC message may include a UE identifier for discontinuous reception.

Embodiment of Indicating UE Identifier (e.g., L1 Destination ID, L1 Source ID, Etc.) for Discontinuous Reception The discontinuous reception function may be configured through the above-described RRC signaling or may be preconfigured in the MAC entity.

The UE may be configured with one or more PSCCH resource configurations by RRC signaling. Or, the UE may be pre-configured with one or more PSCCH resource configurations. The PSCCH resource configuration may be for PSCCH reception or for PSCCH transmission. The PSCCH resource configuration may be associated per sidelink transmission mode. The UE may be configured to detect the corresponding SCI format on the PSCCH by the higher layer for each PSCCH resource configuration associated to each sidelink transmission mode. In this case, the UE may attempt PSCCH decoding using one or more information of PSCCH resource configuration, L1 source ID and L1 destination ID.

According to an embodiment, the UE may control, through the discontinuous reception function, the PSCCH monitoring operation on any sidelink RNTI in the MAC entity (e.g., SL-RNTI, SL-V-RNTI, SL-SPS-RNTI, or a unicast-based sidelink RNTI allocated by the scheduling UE, transmission UE, or base station) or L1 destination ID or L1 source ID or L1 source ID and L1 destination ID or L1 groupcast ID or L1 broadcast ID. The any sidelink RNTI, L1 destination ID, L1 source ID, L1 source ID, and L1 destination ID, L1 groupcast ID, L1 broadcast ID may be preconfigured or may be indicated to the UE by RRC signaling. Thus, the corresponding UE may perform/trigger the discontinuous reception operation on the PSCCH associated with the UE identifier.

Embodiment of Parameter for Sidelink Discontinuous Reception

When the UE is in the RRC connected state, the UE's MAC entity may discontinuously receive the PSCCH for all sidelink carriers (or for all activated sidelink carriers or for all configured sidelink carriers). Or, although the UE is in the RRC idle/RRC inactive state, if the discontinuous reception function is preconfigured in the UE or if the DRX is (pre)configured in the UE when the corresponding system information or specific data is received by the base station or any trigger condition, e.g., a change in any state inside the UE, occurs, the UE's MAC entity may discontinuously receive the PSCCH for all sidelink carriers (or for all activated sidelink carriers or for all configured sidelink carriers). Otherwise, the UE may continuously monitor the PSCCH.

For example, the sidelink discontinuous reception parameter may include one or more of the following parameters.

Sidelink discontinuous reception HARQ RTT timer (referred to as drx-HARQ-RTT-TimerSL for convenience of description): Minimum duration information before SCI (or SL grant) for HARQ retransmission is expected by the MAC entity. The corresponding timer may be operated for each SL HARQ process. This may be a parameter from the viewpoint of the reception UE.

Sidelink discontinuous reception retransmission timer (referred to as drx-RetransmissionTimerSL for convenience of description): Maximum duration information until sidelink retransmission is received. The corresponding timer may be operated for each SL HARQ process. This may be a parameter from the viewpoint of the reception UE.

Sidelink discontinuous reception on-duration timer: Duration information at the start of the DRX cycle in the sidelink Sidelink discontinuous reception inactivity timer: Duration information after PSCCH occasion (or PSCCH period or PSCCH reception time) where the PSCCH indicates new sidelink transmission for the MAC entity If the UE receives discontinuous reception considering both transmission and reception through the sidelink, the DRX parameter may include the following parameters.

Sidelink reception discontinuous reception HARQ RTT timer (referred to as drx-HARQ-RTT-TimerRX-SL for convenience of description): Minimum duration information until before reception SCI (or SL grant) for HARQ retransmission is expected by the MAC entity. The corresponding timer may be operated for each SL reception HARQ process.

Sidelink reception discontinuous transmission HARQ RTT timer (referred to as drx-HARQ-RTT-TimerTX-SL for convenience of description): Minimum duration information until before grant [or SCI (e.g., when scheduled by the UE) or DCI (e.g., when scheduling is allocated by the base station)] for transmission HARQ retransmission is expected by the MAC entity. The corresponding timer may be operated for each SL transmission HARQ process.

Sidelink reception discontinuous reception retransmission timer (referred to as drx-RetransmissionTimerRX-SL for convenience of description): Maximum duration information until sidelink retransmission is received. The corresponding timer may be operated for each SL reception HARQ process.

Sidelink transmission discontinuous retransmission timer (referred to as drx-RetransmissionTimerTX-SL for convenience of description): Maximum duration information until grant [or SCI (e.g., when scheduled by the UE) or DCI (e.g., when scheduling is allocated by the base station)] for sidelink retransmission is received. The corresponding timer may be operated for each SL transmission HARQ process.

Embodiment of Indicating DRX Parameter Set Through SIB

A discontinuous reception configuration having a plurality of different parameter values may be possible according to various requirements. According to an embodiment, it is possible to define a plurality of discontinuous reception configuration sets to have different parameter values per carrier/resource pool/UE/MAC entity/group/session. For example, a first preconfiguration set may have small on-duration timer and inactivity timer values to reduce power consumption, and a second preconfiguration set may have medium on-duration timer and inactivity timer values. A third preconfiguration set may have large duration timer and inactivity timer values. The corresponding configuration set may be identified with the index/ID. The UE may preconfigure all of the plurality of discontinuous reception configuration sets having different parameter values.

When the UE pre-configures a plurality of discontinuous reception configuration sets, the base station may instruct to use the discontinuous reception configuration set having a specific parameter value through system information. The UE may apply the corresponding configuration set through the index/ID that identifies the corresponding configuration set. The UE may transmit the index/ID information preferred/requested/expected by the UE to the base station through the UE assistance information (or any uplink RRC message) on the Uu interface.

The UE (e.g., the reception UE) may transmit the index/ID information preferred/requested/expected by the UE to another UE (e.g., the transmission UE) through the UE assistance information (or any sidelink RRC message) on the sidelink interface.

Embodiment when Sidelink DRX HARQ RTT Timer is Configured to have a Larger Value than the DRX HARQ RTT Timer on the Uu Interface For example, when using a sidelink transmission mode (e.g., mode 1) scheduled by the base station, if the transmission UE receives a HARQ feedback (NACK) from the reception UE for HARQ retransmission, the transmission UE indicates (e.g., inform), to the base station, that retransmission is needed. For example, the transmission UE may indicate, to the base station, that retransmission is necessary through at least one of a sidelink HARQ ACK/NACK report via PUCCH or PUSCH, PUCCH, an L1 signaling, BSR, and a MAC CE. Thereafter, the transmission UE may receive the sidelink grant from the base station and perform HARQ retransmission to the reception UE. The sidelink grant transmitted from the base station to the transmission UE may include one or more of sidelink HARQ process ID, NDI, redundancy version, frequency domain resource information, and time domain resource information. When the transmission UE performs sidelink transmission/retransmission, it may include one or more pieces of information included in the sidelink grant received from the base station in the SCI on the PSCCH and transmit it.

As such, for sidelink retransmission, the total RTT may be calculated by adding the round trip time (RTT) on the PC5 interface between the transmission UE and the reception UE to the round trip time (RTT) on the Uu interface between the UE and the base station. In discontinuous reception, it is possible to assume that data reception is not expected during the duration that the HARQ-RTT timer operates.

Accordingly, it is preferable to configure the sidelink DRX HARQ RTT timer to have a larger value than the DRX HARQ RTT timer on the Uu interface. As an example, the sidelink discontinuous reception HARQ RTT timer (e.g., drx-HARQ-RTT-TimerRX-SL, drx-HARQ-RTT-TimerTX-SL, drx-HARQ-RTT-TimerSL) may be allowed to have a larger value (e.g., twice the Uu interface setting value) than the Uu interface discontinuous reception HARQ RTT (e.g., drx-HARQ-RTT-TimerDL, drx-HARQ-RTT-TimerUL).

FIG. 19 is a view illustrating a DRX configuration (DRX-Config) information element according to an embodiment.

Referring to FIG. 19, in the typical NR technology, the drx-HARQ-RTT-Timer could be configured by selecting a value between 0 and 56 symbols. 56 symbols correspond to 4 ms in the case of 15 kHz subcarrier spacing. If the sidelink discontinuous reception HARQ RTT timer has the same range, power consumption of the UE may be unnecessarily increased. Therefore, the sidelink discontinuous reception HARQ RTT timer may be configured to a value larger than the typical maximum value, 56 symbols (e.g., 112 symbols, which is a double or any natural number larger than 56 symbols, or any natural number larger than 56 symbols and less than 112 symbols).

Each parameter of FIG. 19 is defined as follows.
drx-HARQ-RTT-TimerDL: Value in number of symbols of the BWP where the transport block was received.
drx-HARQ-RTT-TimerUL: Value in number of symbols of the BWP where the transport block was received.
drx-RetransmissionTimerDL: Value in number of slot lengths of the BWP where the transport block was transmitted. sl0 corresponds to 0 slots, sl1 corresponds to 1 slot, sl2 corresponds to 2 slots, and so on.
drx-RetransmissionTimerUL
Value in number of slot lengths of the BWP where the transport block was transmitted. sl0 corresponds to 0 slots, sl1 corresponds to 1 slot, sl2 corresponds to 2 slots, and so on.

Embodiment of Performing Discontinuous Reception (DRX) Considering Whether HARQ is Fed Back Upon providing sidelink communication in an inter-UE unicast scheme, it is preferable to configure an L1/L2 procedure to perform efficient transmission considering various factors, such as inter-UE distance, application type, and QoS requirements. According an embodiment, HARQ feedback may be deactivated (disabled) per HARQ process or for all HARQ processes belonging to the SL HARQ entity. For example, HARQ feedback from the HARQ reception UE to transmission UE may be disabled per HARQ process. For convenience of description, this is referred to as HARQ feedback disable. This is only for convenience of description and may be replaced with other name meaning disabling HARQ, such as HARQ disable, HARQ deactivation, no SL HARQ feedback, HARQ feedback disable in sidelink reception UE.

If HARQ feedback is activated (enabled) (in the corresponding HARQ process), when the reception UE receives SCI from the transmission UE (e.g., if the PSCCH indicates sidelink transmission), the sidelink discontinuous reception HARQ RTT timer (e.g., drx-HARQ-RTT-TimerRX-SL, drx-HARQ-RTT-TimerTX-SL, drx-HARQ-RTT-TimerSL) starts.

If the sidelink discontinuous reception HARQ RTT timer (e.g., drx-HARQ-RTT-TimerRX-SL, drx-HARQ-RTT-TimerTX-SL, drx-HARQ-RTT-TimerSL) expires, the sidelink discontinuous reception retransmission timer (drx-RetransmissionTimerRX-SL, drx-RetransmissionTimerTX-SL, drx-RetransmissionTimerSL) starts.

Otherwise, if HARQ feedback is disabled (in the corresponding HARQ process), when the reception UE receives SCI from the transmission UE (e.g., if the PSCCH indicates sidelink transmission), the sidelink discontinuous reception HARQ RTT timer (e.g., drx-HARQ-RTT-TimerRX-SL, drx-HARQ-RTT-TimerTX-SL, drx-HARQ-RTT-TimerSL) is not applied. Or, if the HARQ feedback is disabled (in the corresponding HARQ process), the sidelink discontinuous reception HARQ RTT timer is also disabled. Or, if the HARQ feedback is disabled, the sidelink discontinuous reception HARQ RTT timer may be set to a specific value (e.g., 0). If the sidelink discontinuous reception HARQ RTT timer is disabled for the corresponding HARQ process, the sidelink discontinuous reception retransmission timer may also be disabled. Or, the sidelink discontinuous reception retransmission timer may be set to a specific value (e.g., 0).

According to another embodiment, although the sidelink discontinuous reception HARQ RTT timer is disabled for the corresponding HARQ process, if the transmission UE is configured to perform retransmission for reliable transmission or if the reception UE is able to expect retransmission accordingly, the sidelink discontinuous reception retransmission timer may start. Such embodiment will be described below in detail.

According to still another embodiment, if HARQ feedback is enabled or disabled (in the corresponding HARQ process), when the reception UE receives SCI from the transmission UE (e.g., if the PSCCH indicates sidelink transmission), if repeated transmission is preconfigured/configured, the sidelink discontinuous reception HARQ RTT timer (e.g., drx-HARQ-RTT-TimerRX-SL, drx-HARQ-RTT-TimerTX-SL, drx-HARQ-RTT-TimerSL) starts after the corresponding repeated transmission is terminated.

Whether the above-described HARQ feedback is performed (enabled/disabled) may be configured in the UE through RRC signaling. For example, whether HARQ feedback is performed (enabled/disabled) may be configured in association with a specific logical channel. According to an embodiment, the sidelink logical channel configuration information may include information for indicating HARQ feedback enable/disable restriction in logical channel priority (LCP) for the sidelink logical channel. The HARQ feedback enable-configured logical channel and the HARQ feedback disable-configured logical channel may not be multiplexed into the same MAC PDU. In the sidelink HARQ process performing transmission/retransmission on the MAC PDU of the sidelink HARQ feedback enable-configured logical channel, the physical layer may be indicated to monitor the PSFCH for the transmission/retransmission. According to another embodiment, whether HARQ feedback is performed (enabled/disabled) may be configured per HARQ process ID. According to still another embodiment, whether HARQ feedback is performed (enabled/disabled) may be configured in association with a specific L1 source ID or L1 destination ID or a specific UE or a specific MAC entity (e.g. MCG MAC, SCG MAC) or a specific group/groupcast session (e.g. L1 source ID, L1 destination ID, L2 source ID, L2 destination ID, any combination thereof (e.g. L1 source ID and L1 destination ID)) and a specific broadcast session (e.g. L1 source ID, L1 destination ID, L2 source ID, L2 destination ID, or any combination thereof (e.g. L1 source ID and L1 destination ID)).

Meanwhile, whether HARQ feedback is performed (enabled/disabled) as described above may be indicated (e.g., informed) to the reception UE through SCI. For example, the transmission UE may determine whether to perform HARQ feedback based on, e.g., QoS parameter and channel busy ratio (CBR) for the TB (or MAC PDU) to be transmitted and include information for indicating whether HARQ feedback is performed in the SCI and send it.

Meanwhile, even when HARQ feedback is disabled on the sidelink, the transmission UE may perform blind repeated transmission to increase the reliability of transmission. According to an embodiment, the transmission UE may perform multiple transmissions (e.g., MAC schedules packets in a bundle with pdsch-AggregationFactor>1 in down link) of the same transport block (TB) in bundle. The reception UE may soft-combine the multiple transmissions of the same TB in bundle. According to another embodiment, the transmission UE may perform multiple transmissions (e.g., MAC schedules the same TB on the same HARQ process without NDI being toggled) of the same transport block (TB). The reception UE may soft-combine the multiple transmissions of the same TB. If the transmission UE reduces the BLER through (blind) repeated transmission, the transmission UE and reception UE may preconfigure/configure the times when repeated transmission is expected to be aligned and perform PDCCH monitoring, thereby reducing power consumption.

To that end, when HARQ feedback is disabled through an RRC message (or through any L1/L2 signaling), the transmission UE may indicate information for repeated transmission to the reception UE. Or, when HARQ feedback is disabled, the reception UE may efficiently process repeated transmission by monitoring the PSCCH using the sidelink discontinuous reception retransmission timer (drx-RetransmissionTimerTX-SL, RetransmissionTimerRX-SL RetransmissionTimerSL) or sidelink discontinuous reception inactivity timer.

According to an embodiment, the UE may monitor the PSCCH during the time when repeated transmission is expected, using the sidelink discontinuous reception retransmission timer (drx-RetransmissionTimerTX-SL, RetransmissionTimerRX-SL RetransmissionTimerSL). For example, when HARQ feedback is disabled, if the PSCCH indicates sidelink transmission, and the data of the corresponding HARQ process is not successfully decoded, the UE (MAC entity) starts the sidelink discontinuous reception retransmission timer.

According to another embodiment, a new DRX parameter defining maximum duration may be defined until repeated transmission is received, and the UE may monitor the PSCCH during the time when repeated transmission is expected. When a DRX cycle is configured, the UE may be included in the active time while the timer is operated according to the newly defined DRX parameter. For example, when HARQ feedback is disabled, if the PSCCH indicates sidelink transmission, and the data of the corresponding HARQ process is not successfully decoded, the UE (MAC entity) starts the timer according to the newly defined DRX parameter.

Meanwhile, if HARQ feedback is disabled, and if it is not the case of blind repeated transmission, the UE may transmit data by always indicating new transmission through PSCCH. In such a case, the UE (the UE's MAC entity) starts or restarts the sidelink discontinuous reception inactivity timer at the first symbol after the PSCCH reception ends. Or, even in the case of repeated transmission, not new transmission, if the PSCCH indicates sidelink transmission, the UE starts or restarts the sidelink discontinuous reception inactivity timer. Or, even in the case of repeated transmission, not new transmission, if the PSCCH indicates sidelink transmission, and the data of the corresponding HARQ process is not successfully decoded, the UE starts or restarts the sidelink discontinuous reception inactivity timer. The base station sets the DR inactivity timer to a non-zero value and indicates, thereby instructing to monitor the PSCCH in accordance with the timer for blind repeated transmission with the UE.

Or, it may not be preferable in light of power consumption to allow the UE to monitor the PSCCH, always expecting repeated transmission. Accordingly, if the base station performs repeated transmission to disable the UE's HARQ feedback and reduce the BLER, the base station may transmit indication information to instruct the UE to perform operations accordingly. As an example, the indication information may be provided through RRC signaling. As another example, the indication information may be provided through MAC CE signaling. As another example, the indication information may be provided through SCI. The above-described RRC signaling, MAC CE or SCI may further include at least one information of the HARQ process ID and information indicating the activated/deactivated state of repeated transmission.

Further, the reception UE may transmit assistance information to assist the transmission UE in determining the number of times of repeated transmission to the transmission UE or the base station. The corresponding assistance information may include at least one information of HARQ reception failure rate and number of requested repeated transmissions.

The reception UE may prevent unnecessary power consumption by discontinuously monitoring the PSCCH through the above-described operations.

The DRX operation for PDCCH and/or PSCCH will be briefly described again below with reference to the drawings, for the above-described UE and base station. The UE and the base station may perform the above-described operations all or in any combination thereof.

Figure 20:
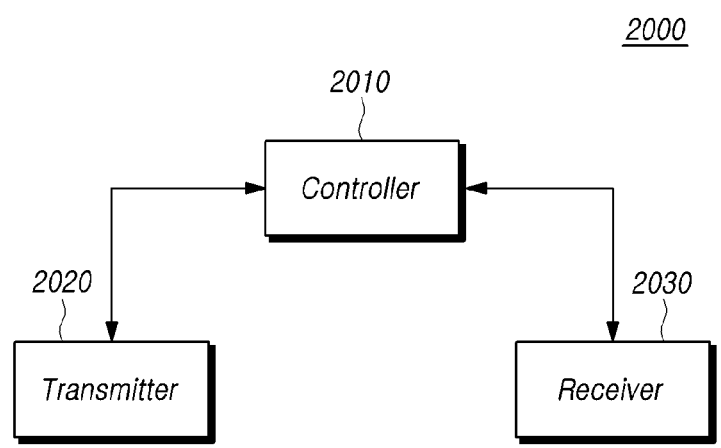
FIG. 20 is a block diagram for describing a UE according to an embodiment.

FIG. 20 is a block diagram for describing a UE according to an embodiment.

Referring to FIG. 20, a UE 2000 performing sidelink communication may include a receiver 2030 for receiving, from a base station, sidelink discontinuous hybrid automatic repeat request (HARQ) configuration information used for physical downlink control channel (PDCCH) monitoring for a sidelink HARQ operation, a transmitter 2020 for transmitting sidelink data, and a controller 2010 monitoring a PDCCH in a PDCCH discontinuous monitoring period configured based on a discontinuous reception (DRX) parameter included in the sidelink discontinuous HARQ configuration information.

The receiver 2030 may receive, from the base station, sidelink non-continuous HARQ configuration information used when performing the HARQ operation by performing sidelink communication. For example, the sidelink discontinuous HARQ configuration information may be received from the base station through higher layer signaling or system information.

The UE 2000 performing sidelink communication may need to transmit HARQ information for sidelink data to the base station according to a sidelink radio resource allocation scheme or according to a setting.

According to an embodiment, when the UE 2000 is dynamically allocated a sidelink radio resource by the base station and transmits sidelink data to another UE, the UE 2000 transmits HARQ information about the sidelink data transmission to the base station. This is because, when sidelink data is not normally transferred to another UE, a sidelink radio resource for retransmission should be reallocated from the base station.

According to another embodiment, the UE 2000 may transmit HARQ information for sidelink data transmission/reception to the base station according to the setting or instruction of the base station.

The transmitter 2020 transmits sidelink data to another UE. In this case, the sidelink data may be transmitted by a unicast scheme, a multicast scheme, or a broadcast scheme. Sidelink data may be transmitted through PSSCH or PSSCH, and there is no limitation, such as control data or user data.

The receiver 2030 may receive HARQ feedback information about the transmitted sidelink data from another UE. However, the HARQ feedback operation for sidelink data may be activated or deactivated. For example, HARQ feedback information indicating NACK may be received only when sidelink data is not normally received by another UE. Alternatively, the HARQ feedback operation may not be performed regardless of whether sidelink data is normally received.

If necessary, the transmitter 2020 may transmit HARQ feedback information for sidelink data to the base station. For example, when the transmitter 2020 receives HARQ feedback information from another UE, the UE may indicate (e.g., transmit, provide) it to the base station. As another example, the transmitter 2020 may indicate to the base station only when HARQ feedback information indicating NACK is received from another UE. As still another example, even when the UE 2000 receives HARQ feedback information from another UE, the UE may not indicate it to the base station.

Meanwhile, when the UE 2000 indicates (e.g., provide, transmit) HARQ feedback information indicating NACK to the base station, the receiver 2030 should receive sidelink resource allocation information for retransmission of sidelink data from the base station. Therefore, the controller 2010 needs to monitor the reception of the PDCCH transmitted from the base station. However, as described above, to prevent power consumption of the UE, the controller 2010 monitors whether the PDCCH is received in the PDCCH discontinuous monitoring period.

The sidelink discontinuous HARQ configuration information may include a discontinuous reception (DRX) parameter for monitoring the PDCCH in the PDCCH discontinuous monitoring period.

According to an embodiment, the DRX parameter may include a discontinuous reception HARQ RTT sidelink timer for specifying the start point of the PDCCH discontinuous monitoring period for monitoring the PDCCH including sidelink resource allocation information for HARQ retransmission of sidelink data. According to another embodiment, the DRX parameter may include the discontinuous reception retransmission sidelink timer for specifying the end point of the PDCCH discontinuous monitoring period. According to still another embodiment, the DRX parameter may include both the discontinuous HARQ RTT sidelink timer and the discontinuous reception retransmission sidelink timer. Here, the timer may mean a corresponding timer value.

The controller 2010 sets a PDCCH discontinuous monitoring period which is set discontinuously using the above-described timer and monitors whether the PDCCH is received.

For example, after transmitting sidelink data, the controller 2010 starts the discontinuous reception HARQ RTT sidelink timer and stops the discontinuous reception retransmission sidelink timer. If the discontinuous reception HARQ RTT sidelink timer expires, the controller 2010 starts the discontinuous reception retransmission sidelink timer. The controller 2010 monitors the PDCCH only when the discontinuous reception retransmission sidelink timer operates. In other words, the case where the discontinuous reception retransmission sidelink timer operates may mean the PDCCH discontinuous monitoring period. In other words, the discontinuous reception HARQ RTT sidelink timer may mean a standby time up to the start of PDCCH monitoring.

Meanwhile, the discontinuous reception retransmission sidelink timer may start if a preset event occurs after the discontinuous reception HARQ RTT sidelink timer expires.

For example, the preset event may be any one of when sidelink data is not successfully transmitted, when receiving HARQ feedback information indicating failure in transmission of sidelink data, and when transmitting, to the base station, HARQ feedback information indicating failure in transmission for sidelink data.

For example, the controller 2010 may not normally transmit sidelink data. In this case, if the discontinuous reception HARQ RTT sidelink timer expires, the controller 2010 may start the discontinuous reception retransmission sidelink timer.

As another example, the controller 2010 may receive, from another UE, HARQ feedback information indicating NACK for the sidelink data and. If the HARQ RTT sidelink timer expires, the controller 2010 may initiate the discontinuous reception retransmission sidelink timer.

As still another example, in the case where the controller 2010 may receive HARQ feedback information indicating NACK for sidelink data from another UE and transmits it to the base station. If the HARQ RTT sidelink timer expires, the controller 2010 may initiate the discontinuous reception retransmission sidelink timer.

The value of the discontinuous reception HARQ RTT sidelink timer may be dynamically set depending on what condition a preset event related to the start time of the discontinuous reception retransmission sidelink timer has been set.

If receiving the PDCCH for retransmission of sidelink data in the PDCCH discontinuous monitoring period, the transmitter 2020 retransmits, to another UE, sidelink data based on the sidelink resource allocation information on the PDCCH.

Besides, the controller 2010 controls the overall operation of the UE 2000, necessary to discontinuously monitor the PDCCH or PSCCH necessary to perform the above-described embodiments.

Further, the transmitter 2020 and the receiver 2030 are used to transmit or receive signals or messages or data necessary for performing the above-described disclosure, with another UE and the base station.

Figure 21:
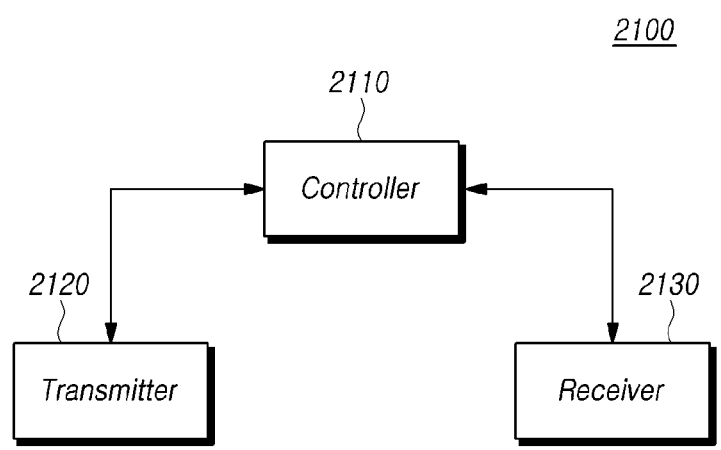
FIG. 21 is a block diagram for describing a base station according to an embodiment.

FIG. 21 is a block diagram for describing a base station according to an embodiment.

Referring to FIG. 21, a base station 2100 controlling sidelink communication may include a transmitter 2120 for transmitting, to a UE, sidelink discontinuous HARQ configuration information used for physical downlink control channel (PDCCH) monitoring for a sidelink HARQ operation and a receiver 2130 for receiving, from the UE, HARQ feedback information for sidelink data transmission.

The transmitter 2120 transmits the PDCCH including sidelink resource allocation information for HARQ retransmission of sidelink data in the PDCCH discontinuous monitoring period of the UE, set based on the discontinuous reception (DRX) parameter included in the sidelink discontinuous HARQ configuration information.

For example, the sidelink non-continuous HARQ configuration information may be transmitted through higher layer signaling or system information. The sidelink discontinuous HARQ configuration information may be for DRX operation between the UE and the symbol and may be distinguished from information for DRX operation in sidelink communication between the UE and another UE. Similarly, it may also be distinguished from the DRX parameter for Uu interface communication between the base station and the UE, not sidelink communication.

The UE may transmit sidelink data to another UE and receive HARQ feedback information about sidelink data from another UE according to a setting. In this case, the sidelink data may be transmitted by a unicast scheme, a multicast scheme, or a broadcast scheme. Sidelink data may be transmitted through PSSCH or PSSCH, and there is no limitation, such as control data or user data.

However, the HARQ feedback operation for sidelink data may be activated or deactivated. For example, HARQ feedback information indicating NACK may be received only when sidelink data is not normally received by another UE. Alternatively, the HARQ feedback operation may not be performed regardless of whether sidelink data is normally received.

If necessary, the receiver 2130 may receive HARQ feedback information for sidelink data from the UE. As an example, the receiver 2130 may receive HARQ feedback information received by the UE from another UE. As another example, the receiver 2130 may receive HARQ feedback information from the UE only when the HARQ feedback information received by the UE from another UE indicates NACK. As still another example, although the UE receives HARQ feedback information from another UE, the base station 2100 may not receive information thereabout.

Meanwhile, if the HARQ feedback information received from the UE indicates NACK, the transmitter 2120 may transmit sidelink resource allocation information for sidelink data retransmission to the UE. The sidelink resource allocation information may be transmitted through the PDCCH, but this is exemplary, and it may be transferred through various downlink channels, e.g., PDSCH.

The PDCCH including sidelink resource allocation information may be transmitted to the UE in the PDCCH discontinuous monitoring period.

The PDCCH discontinuous monitoring period may be determined by the DRX parameter included in the sidelink discontinuous HARQ configuration information.

As another example, the DRX parameter may include the discontinuous reception HARQ RTT sidelink timer for specifying the start point of the PDCCH discontinuous monitoring period. As still another example, the DRX parameter may include the discontinuous reception retransmission sidelink timer for specifying the end point of the PDCCH discontinuous monitoring period. As yet another example, the DRX parameter may include both the discontinuous HARQ RTT sidelink timer and the discontinuous reception retransmission sidelink timer. Here, the timer may mean a corresponding timer value.

In this case, the UE sets a PDCCH discontinuous monitoring period which is set discontinuously and monitors whether the PDCCH is received.

For example, after transmitting sidelink data, the UE starts the discontinuous reception HARQ RTT sidelink timer and stops the discontinuous reception retransmission sidelink timer. If the discontinuous reception HARQ RTT sidelink timer expires, the UE starts the discontinuous reception retransmission sidelink timer. The UE monitors the PDCCH only when the discontinuous reception retransmission sidelink timer operates. In other words, the case where the discontinuous reception retransmission sidelink timer operates may mean the PDCCH discontinuous monitoring period. In other words, the discontinuous reception HARQ RTT sidelink timer may mean a standby time up to the start of PDCCH monitoring.

Meanwhile, the discontinuous reception retransmission sidelink timer may start if a preset event occurs after the discontinuous reception HARQ RTT sidelink timer expires.

For example, the preset event may be any one of when sidelink data is not successfully transmitted, when receiving HARQ feedback information indicating failure in transmission of sidelink data, and when transmitting, to the base station, HARQ feedback information indicating failure in transmission for sidelink data.

The value of the discontinuous reception HARQ RTT sidelink timer may be dynamically set depending on what condition a preset event related to the start time of the discontinuous reception retransmission sidelink timer has been set.

The transmitter 2120 transmits, to the UE, the PDCCH including sidelink resource allocation information in the set PDCCH discontinuous monitoring period.

Besides, the controller 2110 controls the overall operation of the base station 2200, necessary for the UE to discontinuously monitor the PDCCH or PSCCH necessary to perform the above-described embodiments.

Further, the transmitter 2120 and the receiver 2130 are used to transmit or receive signals or messages or data necessary for performing the above-described embodiments, with the UE.

By the above-described operation, the UE may discontinuously perform base station PDCCH monitoring that occurs as the sidelink communication is performed. Accordingly, the UE may efficiently perform sidelink communication through minimum UE power consumption.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

CROSS-REFERENCE TO RELATED APPLICATION

This application claims priority to Korean Patent Application No. 10-2019-0133035 filed on Oct. 24, 2019, and 10-2020-0127914 filed on Oct. 5, 2020, in the Korean Intellectual Property Office, the disclosures of which are incorporated by reference herein in their entireties.

The invention claimed is:

1. A method for performing sidelink communication by a user equipment (UE), the method comprising,
receiving, from a base station, sidelink discontinuous reception configuration information for controlling an operation for monitoring a physical downlink control channel (PDCCH) associated with a sidelink radio network temporary identifier (RNTI);
receiving a PDCCH for sidelink data transmission; and
controlling the PDCCH monitoring operation in a PDCCH discontinuous monitoring period set based on a discontinuous reception (DRX) parameter included in the sidelink discontinuous reception configuration information,
wherein the DRX parameter includes a discontinuous reception retransmission sidelink timer for indicating maximum duration until the grant for the sidelink retransmission is received,
wherein the discontinuous reception retransmission sidelink timer starts when a preset event occurs after the discontinuous reception HARQ RTT sidelink timer expires, and
wherein the preset event includes at least one of i) when sidelink data is not successfully transmitted, ii) when receiving HARQ feedback information indicating failure in transmission of sidelink data, and iii) when transmitting, to the base station, the HARQ feedback information indicating a failure in transmission for the sidelink data.

2. The method of claim 1, wherein the sidelink discontinuous reception configuration information is received from the base station through higher layer signaling.

3. The method of claim 1, wherein the DRX parameter includes a discontinuous reception HARQ round trip time (RTT) sidelink timer for indicating minimum duration before reception of a grant for sidelink retransmission is expected.

4. The method of claim 1, wherein controlling the PDCCH monitoring operation comprises,
when the PDCCH indicates sidelink transmission, starting a discontinuous reception HARQ RTT sidelink timer included in the DRX parameter and stopping a discontinuous reception retransmission sidelink timer,
when the discontinuous reception HARQ RTT sidelink timer expires, starting the discontinuous reception retransmission sidelink timer, and
when the discontinuous reception retransmission sidelink timer is operating, performings the PDCCH monitoring operation.

5. The method of claim 4, wherein the discontinuous reception retransmission sidelink timer starts at a first symbol after the discontinuous reception HARQ RTT sidelink timer expires.

6. A method for controlling sidelink communication by a base station, the method comprising,
transmitting, to a UE, sidelink discontinuous reception configuration information used for controlling an operation for monitoring a physical downlink control channel (PDCCH) associated with a sidelink radio network temporary identifier (RNTI);
transmitting, to the UE, a PDCCH for sidelink data transmission; and
transmitting a PDCCH including sidelink resource allocation information for HARQ retransmission of the sidelink data in a PDCCH discontinuous monitoring period of the UE, set based on a discontinuous reception (DRX) parameter included in the sidelink discontinuous reception configuration information,
wherein the DRX parameter includes a discontinuous reception retransmission sidelink timer for indicating maximum duration until the grant for the sidelink transmission is received, wherein the discontinuous reception retransmission sidelink timer starts when a preset event occurs after the discontinuous reception HARQ RTT sidelink timer expires, and wherein the preset event includes at least one of i) when sidelink data is not successfully transmitted, ii) when receiving HARQ feedback information indicating failure in transmission of sidelink data, and iii) when transmitting, to the base station, the HARQ feedback information indicating a failure in transmission for the sidelink data.

7. The method of claim 6, wherein the sidelink discontinuous reception configuration information is transmitted through higher layer signaling.

8. The method of claim 6, wherein the DRX parameter includes a discontinuous reception HARQ round trip time (RTT) sidelink timer for indicating minimum duration before a grant for sidelink retransmission is expected.

9. The method of claim 6, wherein the UE is configured to:

when the PDCCH for the sidelink data transmission indicates sidelink transmission, start a discontinuous reception HARQ RTT sidelink timer included in the DRX parameter and stop a discontinuous reception retransmission sidelink timer;

when the discontinuous reception HARQ RTT sidelink timer expires, start the discontinuous reception retransmission sidelink timer; and when the discontinuous reception retransmission sidelink timer is operating, monitor the PDCCH including sidelink resource allocation information for HARQ retransmission of the sidelink data.

10. The method of claim 9, wherein the discontinuous reception retransmission sidelink timer starts at a first symbol after the discontinuous reception HARQ RTT sidelink timer expires.

11. A user equipment (UE) performing sidelink communication, comprising, a receiver configured to receive, from a base station, sidelink discontinuous reception configuration information for controlling an operation for monitoring a physical downlink control channel (PDCCH) associated with a sidelink radio network temporary identifier (RNTI) and receive a PDCCH for sidelink data transmission; and a controller configured to control the PDCCH monitoring operation in a PDCCH discontinuous monitoring period set based on a discontinuous reception (DRX) parameter included in the sidelink discontinuous reception configuration information, wherein the DRX parameter includes a discontinuous reception retransmission sidelink timer for indicating maximum duration until the grant for the sidelink retransmission is received, wherein the discontinuous reception retransmission sidelink timer starts when a preset event occurs after the discontinuous reception HARQ RTT sidelink timer expires, and wherein the preset event includes at least one of i) when sidelink data is not successfully transmitted, ii) when receiving HARQ feedback information indicating failure in transmission of sidelink data, and iii) when transmitting, to the base station, the HARQ feedback information indicating a failure in transmission for the sidelink data.

12. The UE of claim 11, wherein the sidelink discontinuous reception configuration information is received from the base station through higher layer signaling.

13. The UE of claim 11, wherein the DRX parameter includes a discontinuous reception HARQ round trip time (RTT) sidelink timer for indicating minimum duration before a grant for sidelink retransmission is expected.

14. The UE of claim 11, wherein the controller is configured to:

when the PDCCH indicates sidelink transmission, start the discontinuous reception HARQ RTT sidelink timer included in the DRX parameter and stop the discontinuous reception retransmission sidelink timer, when the discontinuous reception HARQ RTT sidelink timer expires, start the discontinuous reception retransmission sidelink timer, and when the discontinuous reception retransmission sidelink timer is operating, perform the PDCCH monitoring operation.

15. The UE of claim 14, wherein the discontinuous reception retransmission sidelink timer starts at a first symbol after the discontinuous reception HARQ RTT sidelink timer expires.

* * * * *